United States Patent
Manolakos et al.

(10) Patent No.: US 12,356,366 B2
(45) Date of Patent: Jul. 8, 2025

(54) MOBILITY ANALYTICS EXCHANGE BETWEEN NETWORK ENTITIES

(71) Applicant: QUALCOMM Incorporated, San Diego, CA (US)

(72) Inventors: Alexandros Manolakos, Escondido, CA (US); Mukesh Kumar, Hyderabad (IN); Srinivas Yerramalli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 406 days.

(21) Appl. No.: 17/814,583

(22) Filed: Jul. 25, 2022

(65) Prior Publication Data
US 2024/0031978 A1    Jan. 25, 2024

(51) Int. Cl.
*H04W 64/00*    (2009.01)
*H04B 17/318*   (2015.01)
*H04B 17/391*   (2015.01)
*H04L 5/00*     (2006.01)
*H04W 48/16*    (2009.01)

(52) U.S. Cl.
CPC ........ *H04W 64/006* (2013.01); *H04B 17/318* (2015.01); *H04B 17/391* (2015.01); *H04L 5/0048* (2013.01); *H04W 48/16* (2013.01)

(58) Field of Classification Search
CPC .................................................. H04W 64/00
See application file for complete search history.

(56) References Cited

U.S. PATENT DOCUMENTS

2024/0107359 A1*  3/2024  Jia ..................... H04W 28/0242

FOREIGN PATENT DOCUMENTS

CN     113573228 A   * 10/2021
WO     2022152414 A1   7/2022

OTHER PUBLICATIONS

3GPP TS 23.288: "3rd Generation Partnership Project, Technical Specification Group Services and System Aspects, Architecture Enhancements For 5G System (5GS) To Support Network Data Analytics Services (Release 17)", 3GPP TS 23.288 V17.5.0, 23288-H50, (3GPP), Mobile Competence Centre, 650, Route Des Lucioles, F-06921 Sophia-Antipolis Cedex, France, Jun. 15, 2022, pp. 1-207, XP052201416, sections 6.5, 6.7, 6.11.4.

(Continued)

*Primary Examiner* — Kevin Kim
(74) *Attorney, Agent, or Firm* — Procopio, Cory, Hargreaves & Savitch LLP/Qualcomm

(57) ABSTRACT

Aspects presented herein may improve the efficiency, accuracy, and/or latency of a UE positioning procedure by enabling mobility analytics associated with a UE or a set of UEs to be exchanged between a location server and an NWDAF, either directly or via another network entity. In one aspect, a first network entity transmits a request for mobility data associated with a set of UEs, where the request for the mobility data is transmitted for a second network entity associated with mobility data analytics. The first network entity receives, based on the request, an indication of the mobility data associated with the set of UEs. The first network performs at least one location function for at least one UE in the set of UEs based on the indication of the mobility data.

30 Claims, 17 Drawing Sheets

(56) References Cited

OTHER PUBLICATIONS

CATT: "KI#4, New Sol: Interaction Between Location Service and NWDAF Based On Existing Architecture", SA WG2 Meeting #S2-150e(e-meeting), S2-2203300, 3rd Generation Partnership Project, Mobile Competence Centre, 650, Route Des Lucioles, F-06921 Sophia-Antipolis Cedex, France, vol. SA WG2, No. e(e-meeting), Apr. 6, 2022-Apr. 12, 2022, Apr. 13, 2022, 3 pages, XP052136166, sections 1.2, 6.X.2-6.X.4.
International Search Report and Written Opinion—PCT/US2023/023606—ISA/EPO—Sep. 15, 2023.
Samsung: "KI#7: New Solution on Support for 5GS Localization via Reference UE", 3GPP SA WG2 Meeting #150E, S2-2202180, 3rd Generation Partnership Project, Mobile Competence Centre, 650, Route Des Lucioles, F-06921 Sophia-Antipolis Cedex, France, vol. SA WG2, No. Elbonia, Apr. 6, 2022-Apr. 12, 2022, Mar. 29, 2022, 4 pages, XP052133025, sections 6.X.1-6.X.4.
VIVO: "New Solution For KI#4: Architecture Enhancement for the Interaction Between LCS and NWDAF", 3GPP TSG-SA WG2#150E e-meeting, S2-2203303, 3rd Generation Partnership Project, Mobile Competence Centre, 650, Route Des Lucioles, F-06921 Sophia-Antipolis Cedex, France, vol. SA WG2, No. e-meeting, Apr. 6, 2022-Apr. 12, 2022, Apr. 12, 2022, 5 pages, XP052135545, sections 6.X.1-6.X.4.

\* cited by examiner

MOBILITY ANALYTICS EXCHANGE BETWEEN NETWORK ENTITIES

TECHNICAL FIELD

The present disclosure relates generally to positioning systems, and more particularly, to positioning systems involving mobility analytics exchange.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus transmits a request for mobility data associated with a set of user equipments (UEs), where the request for the mobility data is transmitted for a second network entity associated with mobility data analytics. The apparatus receives, based on the request, an indication of the mobility data associated with the set of UEs. The apparatus performs at least one location function for at least one UE in the set of UEs based on the indication of the mobility data.

In an aspect of the disclosure, a method, a computer-readable medium, and an apparatus are provided. The apparatus receives a request for mobility data associated with a set of UEs, where the request for the mobility data is received from a first network entity, where the second network entity is associated with mobility data analytics. The apparatus transmits, based on the request, an indication of the mobility data associated with the set of UEs, where the indication of the mobility data is transmitted for the first network entity.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
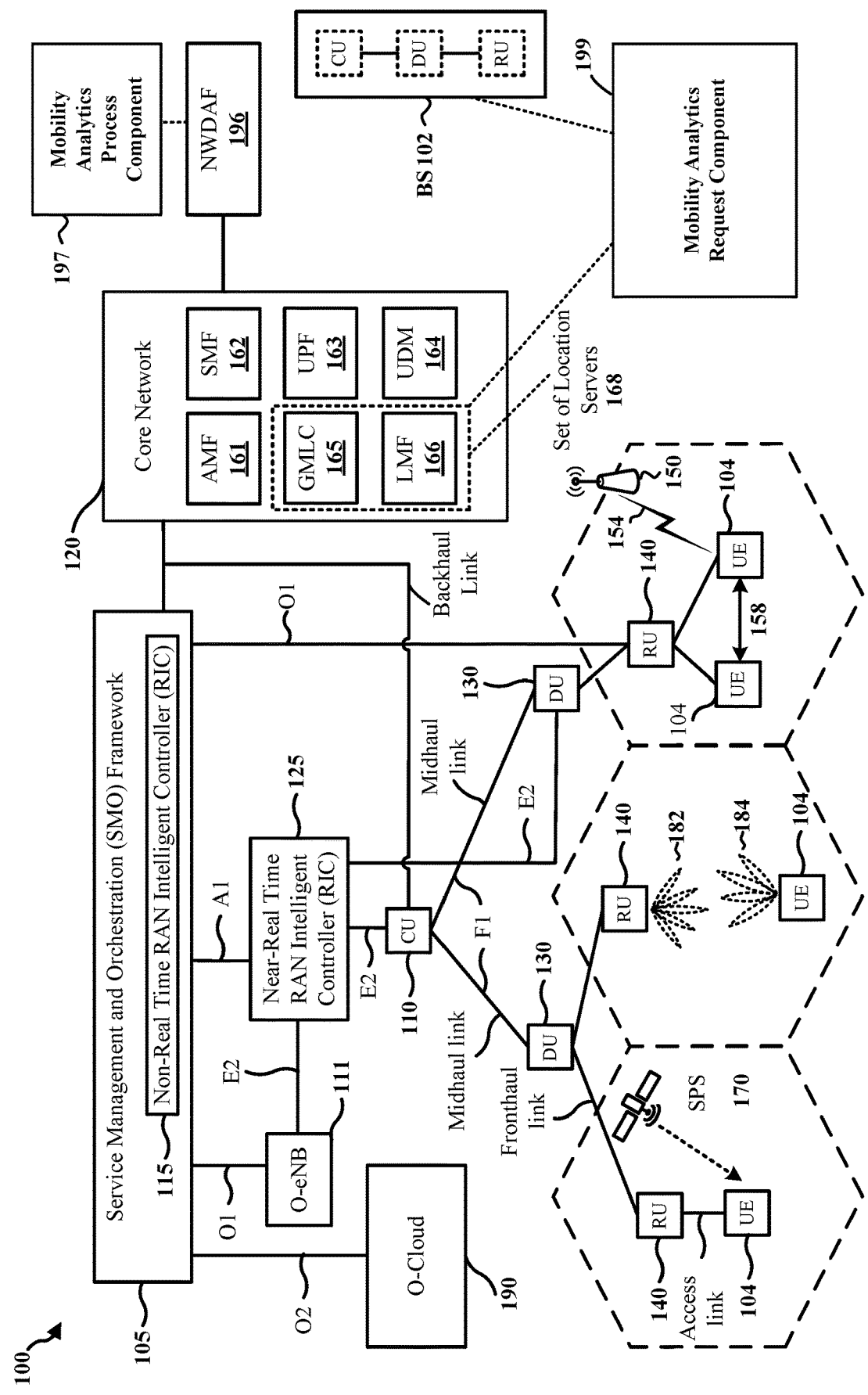
FIG. 1 is a diagram illustrating an example of a wireless communications system and an access network.

Aspects presented herein may improve the efficiency, accuracy, and/or latency of a UE positioning procedure by enabling mobility analytics associated with a UE or a set of UEs to be exchanged between a location server and an NWDAF, either directly or via another network entity. For example, in one aspect of the present disclosure, mobility analytics associated with a UE or a set of UEs may be exchanged between an LMF and an AMF that is associated or communicating with an NWDAF, or between an LMF and an NWDAF for improving location services. In one aspect, an LMF may request and receive the mobility analytics to design different assistance data for a group of UEs identified by the mobility analytics function. For example, the LMF may get input that the NWDAF has identified a group of UEs in a train, and the LMF may send to all UEs within the group of UEs the same assistance data. The assistance data may indicate which TRPs, PRS resource sets, PRS resources to include, and/or the priority used in the assistance data. In another aspect, an LMF participates in a sidelink positioning session may setup an SL-grouping, and uses the group of UEs reported by an NWDAF to determine a set of UEs that are likely to be moving together. In another aspect, the LMF may use the "prediction mobility statistics" for a UE or group of UEs to assign assistance data for upcoming areas according to the provided predictions. In another aspect, the LMF may use the "prediction mobility statistics" for picking, configuring, and/or initiating one or more of the followings: positioning method(s), positioning technology(ies), pre-configuration of measurement gaps, pre-configuration of positioning processing windows, UE-based vs UE-assisted mode of operation/positioning, expected RSTD window(s), and/or expected AoD/AoA window(s), etc.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit.

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit wireless signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RA configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a transmit reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station 102. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the LMF 166 may be configured to transmit a request for mobility data associated with a set of UEs, where the request for the mobility data is transmitted for a second network entity associated with mobility data analytics; receive, based on the request, an indication of the mobility data associated with the set of UEs; and perform at least one location function for at least one UE in the set of UEs based on the indication of the mobility data (e.g., via the configuration ID association component 199). In certain aspects, an NWDAF 196 may be configured to receive a request for mobility data associated with a set of UEs, where the request for the mobility data is received from a first network entity, where the second network entity is associated with mobility data analytics; and transmit, based on the request, an indication of the mobility data associated with the set of UEs, where the indication of the mobility data is transmitted for the first network entity (e.g., via the mobility analytics process component 197).

Figure 2:
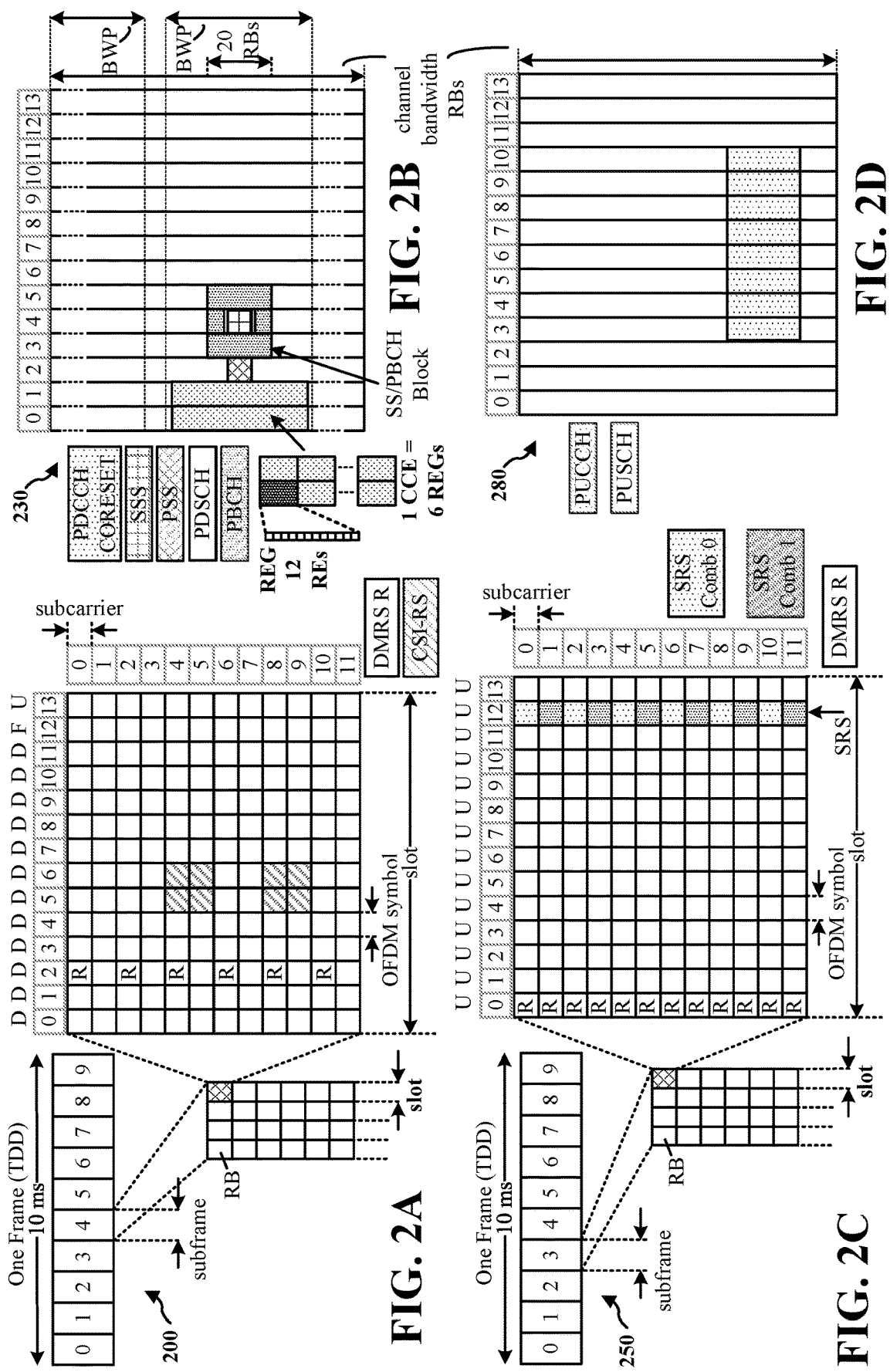
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^{\mu} \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^{\mu}$ slots/subframe. The subcarrier spacing may be equal to $2^{\mu}*15$ kHz, where $\mu$ is the numerology 0 to 4. As such, the numerology $\mu$=0 has a subcarrier spacing of 15 kHz and the numerology 1.1=4 has a subcarrier spacing of 240 kHz. The symbol length/duration is inversely related to the subcarrier spacing. FIGS. 2A-2D provide an example of normal CP with 14 symbols per slot and numerology $\mu$=2 with 4 slots per subframe. The slot duration is 0.25 ms, the subcarrier spacing is kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIB s), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
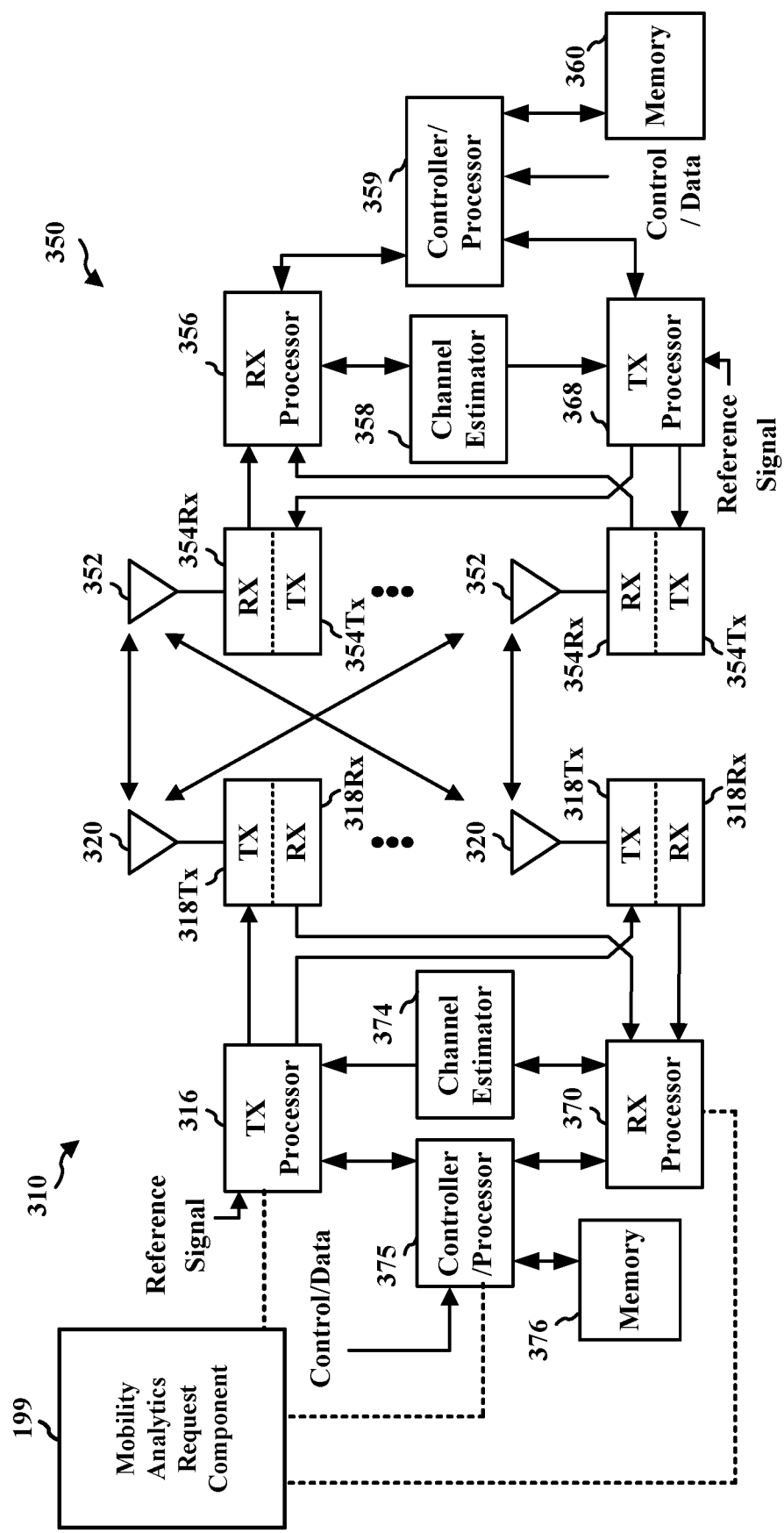
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIB s), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIB s) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 316, the RX processor 370, and the controller/processor 375 may be configured to perform aspects in connection with the mobility analytics request component 199 of FIG. 1.

Figure 4:
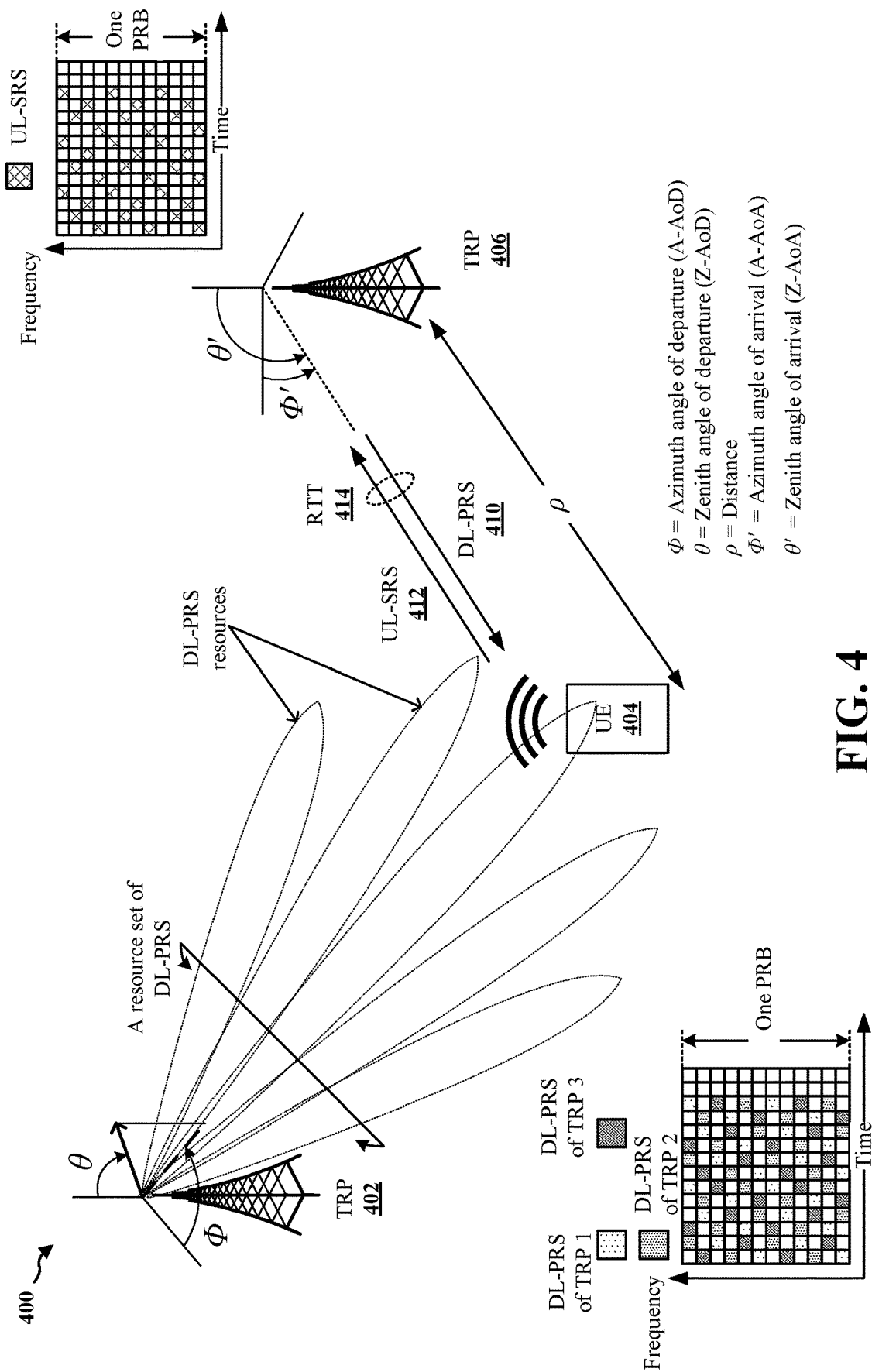
FIG. 4 is a diagram illustrating an example of a UE positioning based on reference signal measurements.

FIG. 4 is a diagram 400 illustrating an example of a UE positioning based on reference signal measurements (which may also be referred to as "network-based positioning") in accordance with various aspects of the present disclosure. The UE 404 may transmit UL-SRS 412 at time $T_{SRS\_TX}$ and receive DL positioning reference signals (PRS) (DL-PRS) 410 at time $T_{PRS\_RX}$. The TRP 406 may receive the UL-SRS 412 at time $T_{SRS\_RX}$ and transmit the DL-PRS 410 at time $T_{PRS\_TX}$. The UE 404 may receive the DL-PRS 410 before transmitting the UL-SRS 412, or may transmit the UL-SRS 412 before receiving the DL-PRS 410. In both cases, a positioning server (e.g., location server(s) 168) or the UE 404 may determine the RTT 414 based on $\|T_{SRS\_RX} - T_{PRS\_TX}\| - \|T_{SRS\_TX} - T_{PRS\_RX}\|$. Accordingly, multi-RTT positioning may make use of the UE Rx-Tx time difference measurements (i.e., $|T_{SRS\_TX} - T_{PRS\_RX}|$) and DL-PRS reference signal received power (RSRP) (DL-PRS-RSRP) of downlink signals received from multiple TRPs 402, 406 and measured by the UE 404, and the measured TRP Rx-Tx time difference measurements (i.e., $|T_{SRS\_RX} - T_{PRS\_TX}|$) and UL-SRS-RSRP at multiple TRPs 402, 406 of uplink signals transmitted from UE 404. The UE 404 measures the UE Rx-Tx time difference measurements (and/or DL-PRS-RSRP of the received signals) using assistance data received from the positioning server, and the TRPs 402, 406 measure the gNB Rx-Tx time difference measurements (and/or UL-SRS-RSRP of the received signals) using assistance data received from the positioning server. The measurements may be used at the positioning server or the UE 404 to determine the RTT, which is used to estimate the location of the UE 404. Other methods are possible for determining the RTT, such as for example using downlink (DL)-time difference of arrival (TDOA) (DL-TDOA) and/or uplink TODA (UL-TDOA) measurements.

DL-AoD positioning may make use of the measured DL-PRS-RSRP of downlink signals received from multiple TRPs 402, 406 at the UE 404. The UE 404 measures the DL-PRS-RSRP of the received signals using assistance data received from the positioning server, and the resulting measurements are used along with the azimuth angle of departure (A-AoD), the zenith angle of departure (Z-AoD), and other configuration information to locate the UE 404 in relation to the neighboring TRPs 402, 406.

DL-TDOA positioning may make use of the DL reference signal time difference (RSTD) (and/or DL-PRS-RSRP) of downlink signals received from multiple TRPs 402, 406 at the UE 404. The UE 404 measures the DL RSTD (and/or DL-PRS-RSRP) of the received signals using assistance data received from the positioning server, and the resulting measurements are used along with other configuration information to locate the UE 404 in relation to the neighboring TRPs 402, 406.

UL-TDOA positioning may make use of the UL relative time of arrival (RTOA) (and/or UL-SRS-RSRP) at multiple TRPs 402, 406 of uplink signals transmitted from UE 404. The TRPs 402, 406 measure the UL-RTOA (and/or UL-SRS-RSRP) of the received signals using assistance data received from the positioning server, and the resulting measurements are used along with other configuration information to estimate the location of the UE 404.

UL-AoA positioning may make use of the measured azimuth angle of arrival (A-AoA) and zenith angle of arrival (Z-AoA) at multiple TRPs 402, 406 of uplink signals transmitted from the UE 404. The TRPs 402, 406 measure the A-AoA and the Z-AoA of the received signals using assistance data received from the positioning server, and the resulting measurements are used along with other configuration information to estimate the location of the UE 404.

Additional positioning methods may be used for estimating the location of the UE 404, such as for example, UE-side UL-AoD and/or DL-AoA. Note that data/measurements from various technologies may be combined in various ways to increase accuracy, to determine and/or to enhance certainty, to supplement/complement measurements, and/or to substitute/provide for missing information. For purposes of the present disclosure, the suffixes "-based" and "-assisted" may refer respectively to the node that is responsible for making the positioning calculation (and which may also provide measurements) and a node that provides measurements (but which may not make the positioning calculation). For example, an operation in which measurements are provided by a UE to a base station/positioning entity to be used in the computation of a position estimate may be described as "UE-assisted," "UE-assisted positioning," and/or "UE-assisted position calculation" while an operation in which a UE computes its own position may be described as "UE-based," "UE-based positioning," and/or "UE-based position calculation."

Note that the terms "positioning reference signal" and "PRS" generally refer to specific reference signals that are used for positioning in NR and LTE systems. However, as used herein, the terms "positioning reference signal" and "PRS" may also refer to any type of reference signal that can be used for positioning, such as but not limited to, PRS as defined in LTE and NR, TRS, PTRS, CRS, CSI-RS, DMRS, PSS, SSS, SSB, SRS, UL-PRS, etc. In addition, the terms "positioning reference signal" and "PRS" may refer to downlink or uplink positioning reference signals, unless otherwise indicated by the context. If needed to further distinguish the type of PRS, a downlink positioning reference signal may be referred to as a "DL-PRS," and an uplink positioning reference signal (e.g., an SRS-for-positioning, PTRS) may be referred to as an "UL-PRS." In addition, for signals that may be transmitted in both the uplink and downlink (e.g., DMRS, PTRS), the signals may be prepended with "UL" or "DL" to distinguish the direction. For example, "UL-DMRS" may be differentiated from "DL-DMRS."

A positioning frequency layer (PFL) (or a "frequency layer" in some examples) may refer to a collection of one or more PRS resource sets across one or more TRPs that have the same values for certain parameters. Specifically, the collection of PRS resource sets may have the same subcarrier spacing and cyclic prefix (CP) type (e.g., meaning all numerologies supported for PDSCHs are also supported for PRS), the same Point A, the same value of the downlink PRS bandwidth, the same start PRB (and center frequency), and/or the same comb-size, etc. The Point A parameter may take the value of a parameter ARFCN-ValueNR (where "ARFCN" stands for "absolute radio-frequency channel number") and may be an identifier/code that specifies a pair of physical radio channel used for transmission and reception. In some examples, a downlink PRS bandwidth may have a granularity of four PRBs, with a minimum of 24 PRBs and a maximum of 272 PRBs. In other examples, up to four frequency layers may be configured, and up to two PRS resource sets may be configured per TRP per frequency layer.

The concept of a frequency layer may be similar to a component carrier (CC) and a BWP, where CCs and BWPs may be used by one base station (or a macro cell base station and a small cell base station) to transmit data channels, while frequency layers may be used by multiple (e.g., three or more) base stations to transmit PRS. A UE may indicate the number of frequency layers it is capable of supporting when the UE sends the network its positioning capabilities, such as during a positioning protocol session. For example, a UE may indicate whether it is capable of supporting one or four PFLs.

In some scenarios, a UE may receive a plurality of PRS resources from multiple TRPs via one or more PFLs, where the UE may not have capabilities to process all of the plurality of PRS resources. As such, the UE may apply a predefined prioritization rule to prioritize measurements of PRS resources. Based on the predefined prioritization rule, the UE may measure a subset of the plurality of PRS resources, and the UE may skip measuring another subset of the plurality of PRS resources.

Figure 5:
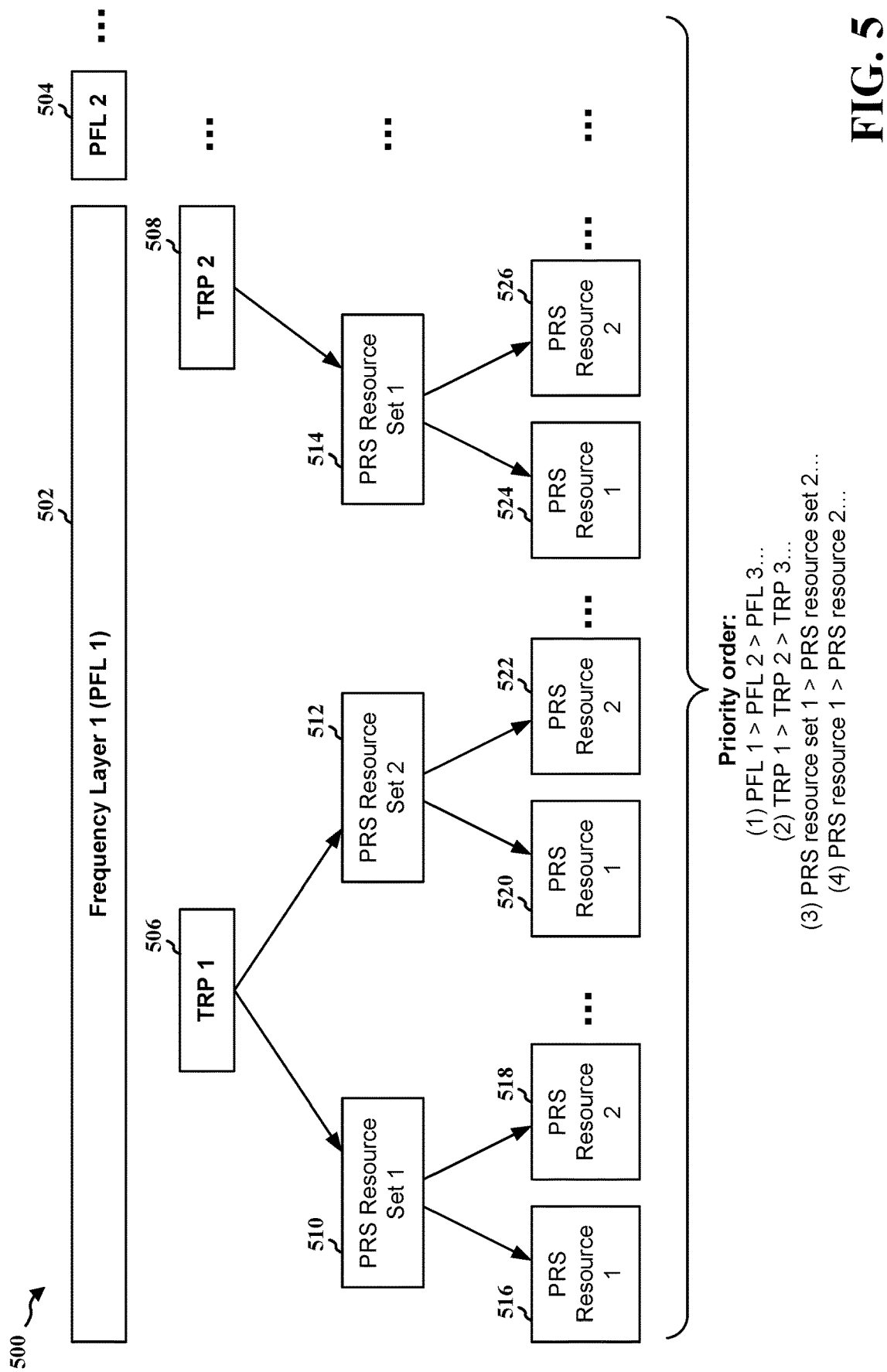
FIG. 5 is a diagram illustrating an example downlink (DL) positioning reference signal (PRS) resource prioritization in accordance with various aspects of the present disclosure.

FIG. 5 is a diagram 500 illustrating an example DL PRS resource prioritization in accordance with various aspects of the present disclosure. A UE may be configured with a number of PRS resources in an assistance data of a positioning session, where the number of PRSs resources to be process by the UE may be beyond the processing capability of the UE. In one example, the UE may assume the DL PRS resources in the assistance data are sorted in a decreasing order of measurement priority. For example, if the UE is configured to receive or measure the DL PRS resources via multiple frequency layers (e.g., PFLs), where each PFL may include PRS resources transmitted from multiple TRPs in, the UE may measure the DL PRS resources based on the priority associated with the multiple frequency layers (e.g., from a first frequency layer to a last frequency layer), based on the priority associated with the TRPs in each PFL (e.g., from a first TRP to a last TRP in a PFL), based on the priority associated with the RPS resource sets associated with each TRP (e.g., from a first PRS resource set to a last PRS resource set in a TRP), and based on the priority associated with the RPS resources within each PRS resource set (e.g., from a first PRS resource to a last PRS resource in a resource set), etc.

For example, as shown by the diagram 500, the UE may be configured to receive DL PRSs from a first frequency layer 502 (PFL 1) and a second frequency layer 504 (PFL 2). The first frequency layer 502 may include DL PRSs transmitted from a first TRP 506 and a second TRP 508, where the first TRP 506 may transmit PRSs using a first PRS resource 516 and a second PRS resource 518 in a first PRS resource set 510, and using a first PRS resource 520 and a second PRS resource 522 in a second PRS resource set 512, and the second TRP 508 may transmit PRSs using a first PRS resource 524 and a second PRS resource 526 in a first PRS resource set 514. Similarly, the UE may also receive DL PRSs from the second frequency layer 504 via multiple TRPs, PRS resource sets, and/or PRS resources.

In one example, if the UE does not have the capability to process all the configured PRS resources, the UE may be configured to receive or measure the PRSs received from the first frequency layer 502 first before processing PRSs in the second frequency layer 504. Similarly, if there are also a third frequency layer (PFL 3) and a fourth frequency layer (PFL 4), the UE may be configured to receive or measure the PRSs received from the first frequency layer 502 first, then the PRSs received from the second frequency layer 504, then the PRSs received from the third frequency layer, and then the PRSs received from the fourth frequency layer (e.g., PRSs are processed/measured based on PFL 1>PFL 2>PFL 3>PFL 4). If the UE does not have the capability to process/measure PRSs in a frequency layer, the UE may skip measuring the PRSs in that frequency layer. For example, if the UE is configured to receive the PRSs via the first frequency layer 502 and the second frequency layer 504 but the UE is just able to process/measure PRSs in the first frequency layer 502, the UE may skip PRS measurements for the second frequency layer 504.

Similarly, within a frequency layer, if the UE does not have the capability to process all the PRSs in the frequency layer, the UE may prioritize its PRS measurements based on the priorities associated with the TRPs. For example, the UE may be configured to receive or measure the PRSs received from the first TRP 506 before processing PRSs from the second TRP 508. Similarly, if there are also a third TRP (TRP 3) and a fourth TRP (TRP 4), the UE may be configured to receive or measure the PRSs received from the first TRP 506, then receive or measure the PRSs from the second TRP 508, then receive or measure the PRSs from the third TRP, and then receive or measure the PRSs from the fourth TRP (e.g., PRSs are processed/measured based on TRP 1>TRP 2>TRP 3>TRP 4 with a frequency layer). If the UE does not have the capability to process/measure PRSs from a TRP, the UE may skip measuring the PRSs in that TRP. For example, if the UE is configured to receive the PRSs via the first TRP 506 and the second TRP 508 via the first frequency layer 502 but the UE is just able to process/measure PRSs in the first TRP 506, the UE may skip PRS measurements for the second TRP 508.

Furthermore, within a TRP, if the UE does not have the capability to process all the PRSs in that TRP, the UE may prioritize its PRS measurements based on the priorities associated with the PRS resource sets. For example, the UE may be configured to receive or measure the PRSs received from the first PRS resource set 510 first before processing PRSs from the second PRS resource set 512. Similarly, if there are also a third PRS resource set (PRS resource set 3) and a fourth PRS resource set (PRS resource set 4), the UE may be configured to receive or measure the PRSs received from the first PRS resource set 510 first, then the PRSs received from the second PRS resource set 512, then the PRSs received from the third PRS resource set, and then the PRSs received from the fourth PRS resource set (e.g., PRSs are processed/measured based on PRS resource set 1>PRS resource set 2>PRS resource set 3>PRS resource set 4 with a TRP). If the UE does not have the capability to process/measure PRSs in a PRS resource set, the UE may skip measuring the PRSs in that PRS resource set. For example, if the UE is configured to receive the PRSs via the first PRS resource set 510 and the second PRS resource set 512 from the first TRP 506 but the UE is just able to process/measure PRSs in the first PRS resource set 510, the UE may skip PRS measurements for the second PRS resource set 512.

Lastly, within a PRS resource set, if the UE does not have the capability to process all the PRSs in that PRS resource set, the UE may prioritize its PRS measurements based on the priorities associated with the PRS resources. For example, the UE may be configured to receive or measure the PRSs received from the first PRS resource 516 first before processing PRSs from the second PRS resource 518. Similarly, if there are also a third PRS resource (PRS resource 3) and a fourth PRS resource (PRS resource 4), the UE may be configured to receive or measure the PRSs received from the first PRS resource 516 first, then the PRSs received from the second PRS resource 518, then the PRSs received from the third PRS resource, and then the PRSs received from the fourth PRS resource (e.g., PRSs are processed/measured based on PRS resource 1>PRS resource 2>PRS resource 3>PRS resource 4 with a PRS resource set). If the UE does not have the capability to process/measure PRSs in a PRS resource, the UE may skip measuring the PRSs in that PRS resource. For example, if the UE is configured to receive the PRSs via the first PRS resource 516 and the second PRS resource 518 of the first PRS resource set 510 but the UE is just able to process/measure PRSs in the first PRS resource 516, the UE may skip PRS measurements for the second PRS resource 518.

As such, if a UE is configured with multiple PRS resources via multiple frequency layers, multiple TRPs, multiple PRS resource sets, and/or multiple PRS resources, the UE may sort the frequency layers (e.g., may be up to four frequency layers) according to a priority, sort the TRPs per frequency layer (e.g., may be up to sixty four (64) TRPs per frequency layer) also according to a priority, sort the PRS resource sets per TRP (e.g., may be up to two resource sets per TRP) according to a priority, and/or sort the PRS resource per PRS resource set (e.g., may be up to sixty four (64) PRS resources per PRS resource set). In other words, within a positioning frequency layer, the DL PRS resources may be sorted in the decreasing order of priority for measurement to be performed by the UE, with the reference indicated by nr-DL-PRS-ReferenceInfo being the highest priority for measurement, and the following priority is assumed: (1) up to 64 dl-PRS-IDs of the frequency layer are sorted according to priority; and (2) up to 2 DL PRS resource sets per dl-PRS-ID of the frequency layer are sorted according to priority.

Figures 6A, 6B, 6C:
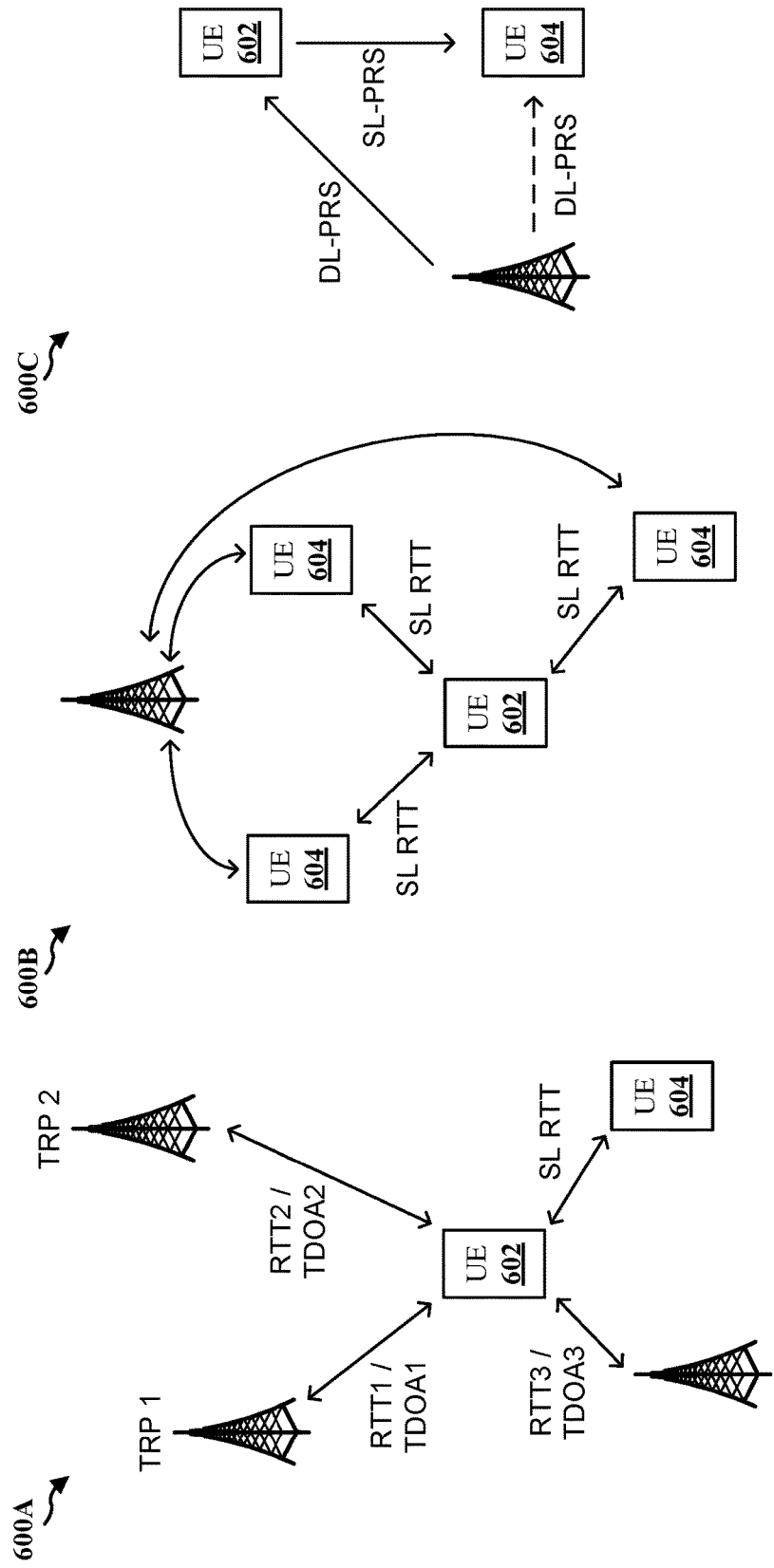
FIG. 6A is a diagram illustrating an example of a joint Uu and sidelink (SL) positioning in accordance with various aspects of the present disclosure.
FIG. 6B is a diagram illustrating an example of an SL positioning in accordance with various aspects of the present disclosure.
FIG. 6C is a diagram illustrating an example a joint Uu and SL positioning in accordance with various aspects of the present disclosure.

In some scenarios, the positioning of a UE may be improved with the assistance of one or more other UEs via sidelink (SL) positioning or communication. FIG. 6A is a diagram 600A illustrating an example of a joint Uu and SL positioning in accordance with various aspects of the present disclosure. In one example, a UE 602 may be within the DL coverage of one or more TRPs (which may be referred to as Uu DL in-coverage), where the UE 602 may receive PRSs transmitted from the one or more TRPs. In addition, the one or more TRPs may also be within the UL coverage of the UE 602 (which may be referred to as Uu UL in-coverage), where the one or more TRPs may receive SRSs transmitted from the UE 602 (or SRSs transmitted by the UE 602 is able to reach the one or more TRPs). As such, the UE 602 may be performing a UE positioning session (which may be referred to as Uu positioning) with the one or more TRPs directly, such as based on RTT and TDoA as described in connection with FIG. 4. In some examples, a UE with a known location may improve the Uu positioning by providing an extra anchor. For example, a UE 604 (e.g., a sidelink device) with a known location may assist the positioning of the UE 602 by providing an anchor for the UE 602, where the UE 604 and the UE 602 may perform an SL based positioning, such as SL RTT. In other words, the UE 604 may serve and function like one of the TRPs by exchanging reference signals with the UE 604. With the additional anchor(s), the positioning of the UE 602 may be improved. For example, the additional anchor(s) may be able to cover directions that are not covered by the one or more TRPs.

FIG. 6B is a diagram 600B illustrating an example of an SL positioning in accordance with various aspects of the present disclosure. In another example, a UE 602 may not be within the DL coverage of one or more TRPs (e.g., no Uu DL in-coverage), where the UE 602 may not be able to receive PRSs transmitted from the one or more TRPs. Similarly, the one or more TRPs may also not be within the UL coverage of the UE 602 (e.g., no Uu UL in-coverage), where the one or more TRPs may not be able to receive SRSs transmitted from the UE 602 (or SRSs transmitted by the UE 602 is unable to reach the one or more TRPs). As such, a positioning entity (e.g., an LMF or a location server) may configure a set of UEs 604 (e.g., sidelink devices that are within the coverage of the UE 602) to perform the SL-based positioning/ranging with the UE 602. Thus, the position of the UE 602 may be determined without Uu DL and UL in-coverages. In some examples, this may apply to positioning of a lower end UE via the help from premium/higher-end UEs. However, if there are no UEs within the coverage area of the UE 602 (e.g., UEs 604 are out of coverage), then the positioning of the UE 602 may be without network involvement (e.g., no Uu involvement).

FIG. 6C is a diagram 600C illustrating an example a joint Uu and SL positioning in accordance with various aspects of the present disclosure. In another example, a UE 602 may be within the DL coverage of one or more TRPs (e.g., Uu DL in-coverage available), where the UE 602 may be able to receive PRSs transmitted from the one or more TRPs. However, the one or more TRPs may not be within the UL coverage of the UE 602 (e.g., no Uu UL in-coverage), where the one or more TRPs may not be able to receive SRSs transmitted from the UE 602 (or SRSs transmitted by the UE 602 is unable to reach the one or more TRPs). In one example, a relay UE 604 (with known location) may participates in the positioning estimation of the UE 602 without UL PRS transmission in Uu. For example, instead of transmitting SRS to the one or more TRPs directly, the UE 602 may transmit the SL RPS to the UE 604. Thus, the positioning of the UE 602 may still be achieved.

A network entity may be associated with or include a network data analytics function (NWDAF), which may be used for collecting data from UEs, network functions, and/or operations, administration, and maintenance (OAM) systems, etc. (e.g., from the 5G core, cloud, and/or edge networks that can be used for analytics). In other words, the NWDAF may be part of the architecture that uses the mechanisms and interfaces specified for 5G and OAM services.

The NWDAF may interact with different entities for different purposes. For example, the NWDAF may perform one or more of the followings: (1) data collection based on subscription to events provided by access and mobility management function (AMF), session management. function (SMF), policy control function (PCF), user data management (UDM), application function (AF) (directly or via NEF), and OAM; (2) analytics and data collection using the data collection coordination function (DCCF); (3) retrieval of information from data repositories (e.g., UDR via UDM for subscriber-related information); (4) storage and retrieval of information from analytics data repository function (ADRF); (5) analytics and data collection from messaging framework adaptor function (MFAF); (6) retrieval of information about network functions (NFs) (e.g., from network repository functions (NRF) for NF-related information); (7) on demand provision of analytics to consumers; and/or (8) provision of bulked data to consumers, etc.

In some examples, a single instance or multiple instances of NWDAF may be deployed in a public land mobile network (PLMN). If multiple NWDAF instances are deployed, the architecture supports deploying the NWDAF as a central NF, as a collection of distributed NFs, or as a combination of both. If multiple NWDAF instances are deployed, an NWDAF can act as an aggregate point (e.g., aggregator NWDAF) and collect analytics information from other NWDAFs, which may have different serving areas, to produce the aggregated analytics (e.g., per analytics ID), possibly with analytics generated by itself. In one example, when multiple NWDAFs exist, not all of them may be specified to provide the same type of analytics results (e.g., some of them may be specialized in providing certain types of analytics). An analytics ID information element (IE) may be used to identify the type of supported analytics that NWDAF can generate. In another example, NWDAF instance(s) may be collocated with a 5GS NF.

A mobility pattern may refer to a network concept of determining within an AMF the UE mobility parameters. For example, the mobility pattern may be a concept that can be used by the AMF to characterize and optimize the UE mobility. The AMF may determine and update the mobility pattern of a UE (or a set of UEs) based on subscription of the UE, statistics of the UE mobility, network local policy, and the UE-assisted information, or any combination of them. The statistics of the UE mobility may be historical or expected UE moving trajectory. If NWDAF is deployed, the statistics of the UE mobility may also be analytics (e.g., statistics or predictions) provided by the NWDAF. In some examples, the mobility pattern may be used by the AMF to optimize mobility support provided to a UE, for example, for registration area allocation.

The NWDAF may be triggered by one or more network entities via various ways. For example, triggers for the AMF to request for or subscribe to the analytics information from the NWDAF may be internal logic in the AMF and may include for example: UE access and mobility related event subscription by other NFs (e.g., SMF, NEF), locally detected events, and/or analytics information received, etc. In some examples, the trigger conditions may depend on operator and implementation policy in the AMF. When a trigger condition happens, the AMF may decide if any analytics information is specified and if so, request for or subscription to the analytics information from the NWDAF. The AMF may, upon detection of certain local events, e.g., frequent mobility re-registration of one or more UEs, subscribe to mobility related abnormal behavior analytics of the UE(s) in order to trace UE mobility trend and take corresponding actions.

The UE related analytics which may be provided by the NWDAF may include UE mobility analytics, UE communication analytics, expected UE behavioral parameters related network data analytics, and/or abnormal behavior related network data analytics. The NWDAF service consumer may request for these analytics separately, or in a combined way. As an example, an NWDAF service consumer may learn from the NWDAF the expected UE behavior parameters for a group of UEs or a specific UE, by requesting analytics for both UE mobility and for UE. Depending on local regulations, the NWDAF may retrieve user consent for the UE with UDM prior to data collection. If user consent to collect data is not granted by the UE, the NWDAF may reject/cancel any analytics subscriptions to any of the UE related analytics with target for analytics set to the SUPI or GPSI of that UE.

In one example, an NWDAF that supports UE mobility statistics or predictions may be able to collect UE mobility related information from NF, OAM, and/or to perform data analytics to provide UE mobility statistics or predictions. The service consumer may be an NF (e.g., AMF, SMF or AF). The consumer of these analytics may indicate in the request one or more of the followings:

Analytics ID="UE Mobility";
Target of Analytics Reporting: a single UE or a group of UEs;
Analytics Filter Information optionally containing:
    Area of Interest (AOI): restricts the scope of the UE mobility analytics to the provided area;
    Visited Area(s) of Interest (visited AOI(s)): additional filter to just consider UEs that are currently (e.g., now) in the "AOI" and had previously (e.g., in an "analytics target period") been in at least one of the visited AOI(s). If this parameter is provided, the analytics target period may be in the past (e.g., supported for statistics);
    For local area data network (LADN) service, the consumer (e.g., SMF) may provide the LADN data network name (DNN) to refer the LADN service area as the AOI.
An Analytics target period indicates the time period over which the statistics or predictions are requested. For regular analytics scenarios, the analytics target period may be associated with the analytics filter information=AOI, while for the scenario that analytics ID=UE mobility and analytics filter information=(AOI and visited AOI(s)), the analytics target period may be associated with the visited AOI(s) and to obtain the statistics for those UEs that currently reside in the AOI and had previously (e.g., in the "analytics target period") been in at least one of the visited AOI(s).
Maximum number of objects;
Suitable or desired level of accuracy of the analytics;
Suitable or desired order of results for the time slot entries: ascending or descending time slot start;
Suitable or desired granularity of location information: TA level or cell level; and
In a subscription, the Notification Correlation Id and the Notification Target Address may be included.

Table 1 below is an example of NWDAF services (e.g., NF services provided by the NWDAF), which may also be referred to as consumer entities of the analytics.

TABLE 1

Consumer Entities of the Analytics

| Service Name | Service Operations | Operation Semantics | Example Consumer(s) |
|---|---|---|---|
| Nnwdaf_AnalyticsSubscription | Subscribe | Subscribe/ Notify | PCF, NSSF, AMF, SMF, NEF, AF, OAM, CEF, NWDAF, DCCF |
| | Unsubscribe | | PCF, NSSF, AMF, SMF, NEF, AF, OAM, CEF, NWDAF, DCCF |
| | Notify | | PCF, NSSF, AMF, SMF, NEF, AF, OAM, CEF, NWDAF, DCCF, MFAF |
| | Transfer | Request/ Response | NWDAF |
| Nnwdaf_AnalyticsInfo | Request | Request/ Response | PCF, NSSF, AMF, SMF, NEF, AF, OAM, CEF, NWDAF, DCCF |
| | Transfer | Request/ Response | NWDAF |
| Nnwdaf_DataManagement | Subscribe | Subscribe/ Notify | NWDAF, DCCF |
| | Notify | | NWDAF, DCCF, MFAF |
| | Fetch | Request/ Response | NWDAF, DCCF, MFAF |
| Nnwdaf_MLModelProvision | Subscribe | Subscribe/ Notify | NWDAF |
| | Unsubscribe | | NWDAF |
| | Notify | | NWDAF |
| Nnwdaf_MLModelInfo | Request | Request/ Response | NWDAF |

The Nnwdaf_MLModelProvision service and the Nnwdaf_MLModelInfo service are provided by an NWDAF containing model training logical function (MTLF) and consumed by an NWDAF containing analytics logical function (AnLF).

The NWDAF supporting data analytics on UE mobility may be able to collect UE mobility information from OAM, 5GC and AFs. The detailed information collected by the NWDAF may be minimization of drive tests (MDT) data from OAM, network data from 5GC and/or service data from AFs. UE mobility information from OAM is UE location carried in MDT data. Network data related to UE mobility from 5GC may be UE location information, UE location trends and/or UE access behavior trends.

Table 2 below is an example of UE Mobility information collected from 5GC.

TABLE 2

Input Data in UE Mobility Analytics

| Information | Source | Description |
|---|---|---|
| UE ID | AMF | SUPI |
| UE locations (1 . . . max) | AMF | UE positions |
| >UE location | | TA or cells that the UE enters |
| >Timestamp | | A time stamp when the AMF detects the UE enters this location |

TABLE 2-continued

Input Data in UE Mobility Analytics

| Information | Source | Description |
|---|---|---|
| Type Allocation code (TAC) | AMF | To indicate the terminal model and vendor information of the UE. The UEs with the same TAC may have similar mobility behavior. The UE whose mobility behavior is unlike other UEs with the same TAC may be an abnormal one. |
| Frequent Mobility Registration Update | AMF | A UE (e.g., a stationary UE) may re-select between neighbor cells due to radio coverage fluctuations. This may lead to multiple Mobility Registration Updates if the cells belong to different registration areas. The number of Mobility Registration Updates N within a period M may be an indication for abnormal ping-pong behavior, where N and M are operator's configurable parameters. |
| UE access behavior trends | AMF | Metrics on UE state transitions (e.g., access, RM and CM states, handover). |
| UE location trends | AMF | Metrics on UE locations. |

Table 3 below is an example of service data related to UE mobility provided by AFs.

TABLE 3

Service Data from AF Related to UE Mobility

| Information | Description |
|---|---|
| UE ID | Could be external UE ID (e.g., GPSI) |
| Application ID | Identifying the application providing this information |
| UE trajectory (1 . . . max) | Timestamped UE positions |
| >UE location | Geographical area that the UE enters |
| >Timestamp | A time stamp when UE enters this area |

NOTE:
The application ID is optional. If the application ID is omitted, the collected UE mobility information can be applicable to all the applications for the UE.

Depending on the requested level of accuracy, data collection may be provided on samples (e.g., spatial subsets of UEs or UE group, temporal subsets of UE location information). In one example, reporting current UE location may cause AMF to request NG-RAN to report UE location and consequently extra signaling and load in NG-RAN and AMF. The consumer retrieving data from AMF may be specified to use current location with care to avoid excessive signaling.

The NWDAF supporting data analytics on UE mobility may be able to provide UE mobility analytics to consumer NFs or AFs. The analytics results provided by the NWDAF may be UE mobility statistics as shown by Table 4 below and/or UE mobility predictions as shown by Table 5 below.

TABLE 4

UE Mobility Statistics

| Information | Description |
|---|---|
| UE group ID or UE ID | Identifies a UE or a group of UEs, e.g., internal group ID, SUPI. |
| Time slot entry (1 . . . max) | List of time slots during the Analytics target period |
| >Time slot start | Time slot start within the Analytics target period |
| >Duration | Duration of the time slot |
| >UE location (1 . . . max) | Observed location statistics |

TABLE 4-continued

UE Mobility Statistics

| Information | Description |
| --- | --- |
| >>UE location | TA or cells which the UE stays |
| >>Ratio | Percentage of UEs in the group (in the case of a UE group) |

In one example, when target of analytics reporting is an individual UE, one UE ID (e.g., SUPI) may be included, the NWDAF may provide the analytics mobility result (e.g., list of (predicted) time slots) to NF service consumer(s) for the UE. In another example, if visited AOI(s) was provided in the analytics request/subscription, the UE location may provide information on the observed location(s) that the UE or group of UEs had been residing during the analytics target period. In another example, when possible and applicable to the access type, UE location may be provided according to the suitable or desired granularity of location information.

TABLE 5

UE Mobility Predictions

| Information | Description |
| --- | --- |
| UE group ID or UE ID | Identifies a UE or a group of UEs, e.g., internal group ID, or SUPI. |
| Time slot entry (1 . . . max) | List of predicted time slots |
| >Time slot start | Time slot start time within the Analytics target period |
| >Duration | Duration of the time slot |
| >UE location (1 . . . max) | Predicted location prediction during the Analytics target period |
| >>UE location | TA or cells where the UE or UE group may move into |
| >>Confidence | Confidence of this prediction |
| >>Ratio | Percentage of UEs in the group (in the case of a UE group) |

Figure 7:
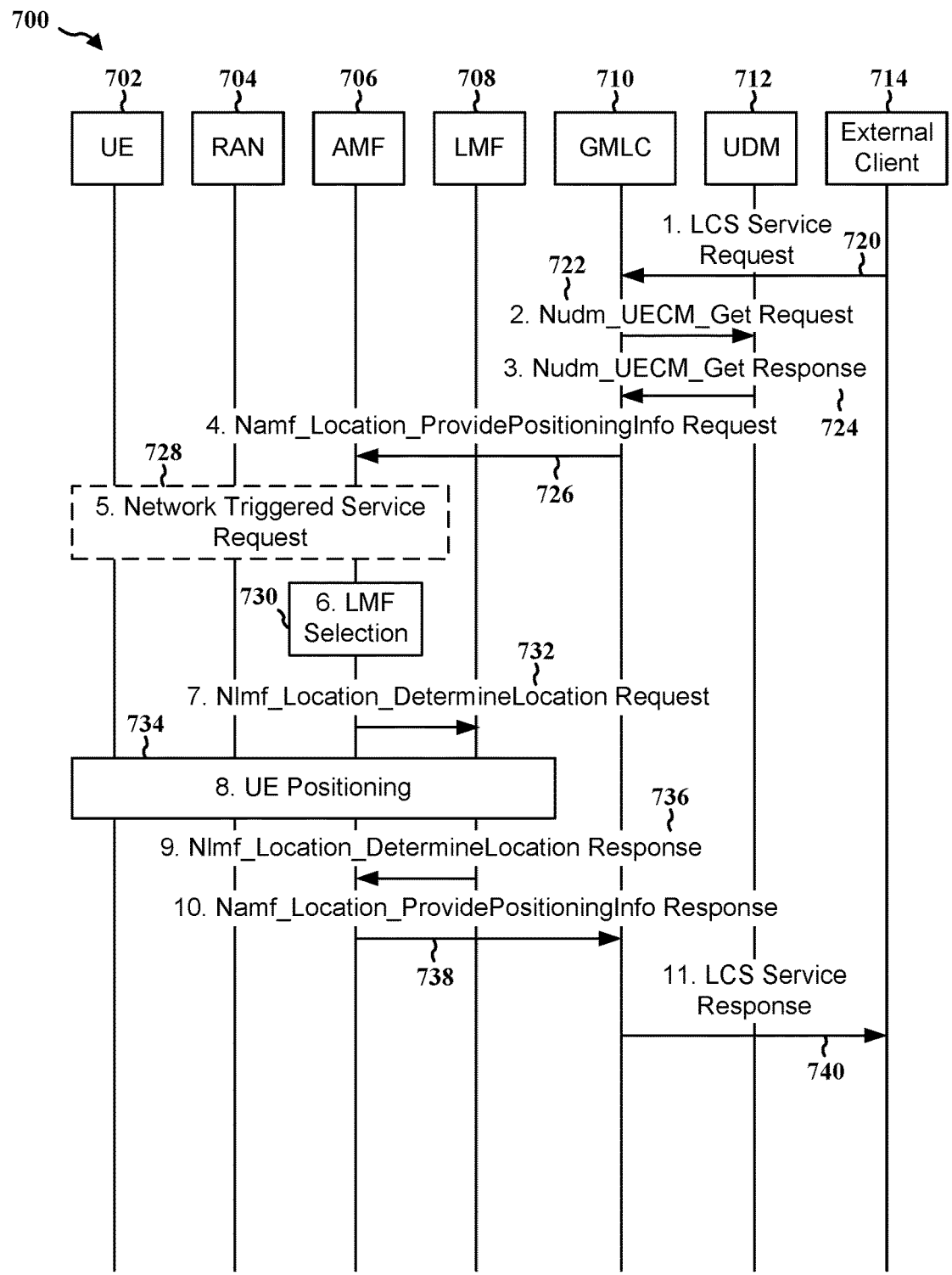
FIG. 7 is a communication flow illustrating an example mobile terminated location requests (MT-LR) procedure for location service in accordance with various aspects of the present disclosure.

FIG. 7 is a communication flow 700 illustrating an example mobile terminated location requests (MT-LR) procedure (e.g., UE-assisted positioning) for location service in accordance with various aspects of the present disclosure. The numberings associated with the communication flow 700 do not specify a particular temporal order and are merely used as references for the communication flow 700. Aspects presented herein may provide a general network positioning for location service (LCS) clients external to the PLMN for location service (e.g., the regulatory location service), such as under a non-roaming scenario. Aspects presented herein may be applicable to a request from an LCS client for a current location of a target UE (e.g., a UE that is participating the positioning), where the LCS client may be authorized to use the location service and no privacy verification is specified.

At 720, an external location services client 714 may send a request (e.g., an LCS service request) to a gateway mobile location center (GMLC) 710 for a location for a target UE 702 identified by a generic public subscription identifier (GPSI) or a subscription permanent identifier (SUPI). The request may include a specified quality of service (QoS), supported geographical area description (GAD) shapes and client type. If location is specified for more than one UE, the steps following below may be repeated and in that case the GMLC 710 may verify whether the number of target UEs in the LCS service request is equal to or less than the maximum target UE number of the LCS client. If maximum target UE number is exceeded, the GMLC 710 may reject the LCS service request, the step 722 to 738 are skipped, and then GMLC 710 may respond to the external location services client 714 with a proper error cause at the step described in connection with 740.

At 722, the GMLC 710 may invoke a Nudm_UECM_Get service operation towards a home unified data management (UDM) 712 of the target UE 702 to be located with the GPSI or SUPI of this UE 702. The Nudm_UECM_Get Service Operation may be used by NFs (e.g., NEF, GMLC, SMSF) to retrieve registration information from an UDM e.g., the NF ID where the UEs access and mobility management context or the PDU sessions context can be reached. The requesting NF may provide a UE ID the NF type is interested in. The Nudm_UECM_Get Service operation may use the UE ID and NF type to search for the registered NF which is returned to the requestor.

At 724, the UDM 712 may return network addresses of a current serving AMF 706, such as via a Nudm_UECM_Get Response message.

At 726, the GMLC 710 may invoke a Namf_Location_ProvidePositioningInfo service operation towards the AMF 706 to request the current location of the UE 702. The service operation may include the SUPI, and client type may include the specified QoS and supported GAD shapes.

At 728, if the UE 702 is in a connection management (CM) idle (CM-IDLE) state, the AMF 706 may initiate a network triggered service request procedure to establish a signaling connection with the UE 702.

At 730, the AMF 706 may select an LMF 708 based on the available information or based on local configuration of the AMF 706. The LMF selection may take the 5G-AN (e.g., a RAN 704) currently serving the UE 702 into account. The selection may use an NRF query.

At 732, the AMF 706 may invoke the Nlmf_Location_DetermineLocation service operation towards the LMF 708 to request the current location of the UE 702. The service operation may include an LCS correlation identifier, the serving cell identity of the primary cell in a master RAN node and a primary cell in the secondary RAN node when available based on dual connectivity scenarios, and the client type may include an indication if UE 702 supports LTE positioning protocol (LPP), the specified QoS and supported GAD shapes. In some examples, the service operation may also include the AMF 706 identity.

At 734, the LMF 708 may perform one or more of the positioning procedures, such as described in connection with FIG. 4. During this step the LMF 708 may use the Namf_Communication_N1N2MessageTransfer service operation to request the transfer of a Positioning related N1 message to the UE 702 or the transfer of a network positioning message to a serving NG-RAN (e.g., the RAN 704) node (gNB or NG-eNB) for the UE 702.

At 736, the LMF 708 may return the Nlmf_Location_DetermineLocation Response towards the AMF 706 to return the current location of the UE 702. The service operation may include the LCS correlation identifier, the location estimate, its age and accuracy and may include information about the positioning method.

At 738, the AMF 706 may return the Namf_Location_ProvidePositioningInfo Response towards the GMLC 710 (or a location retrieval function (LRF)) to return the current location of the UE 702. The service operation may include the location estimate, its age and accuracy and may include information about the positioning method.

At 740, the GMLC 710 may send the location service response (e.g., via an LCD service response message) to the external location services client 714.

Figure 8:
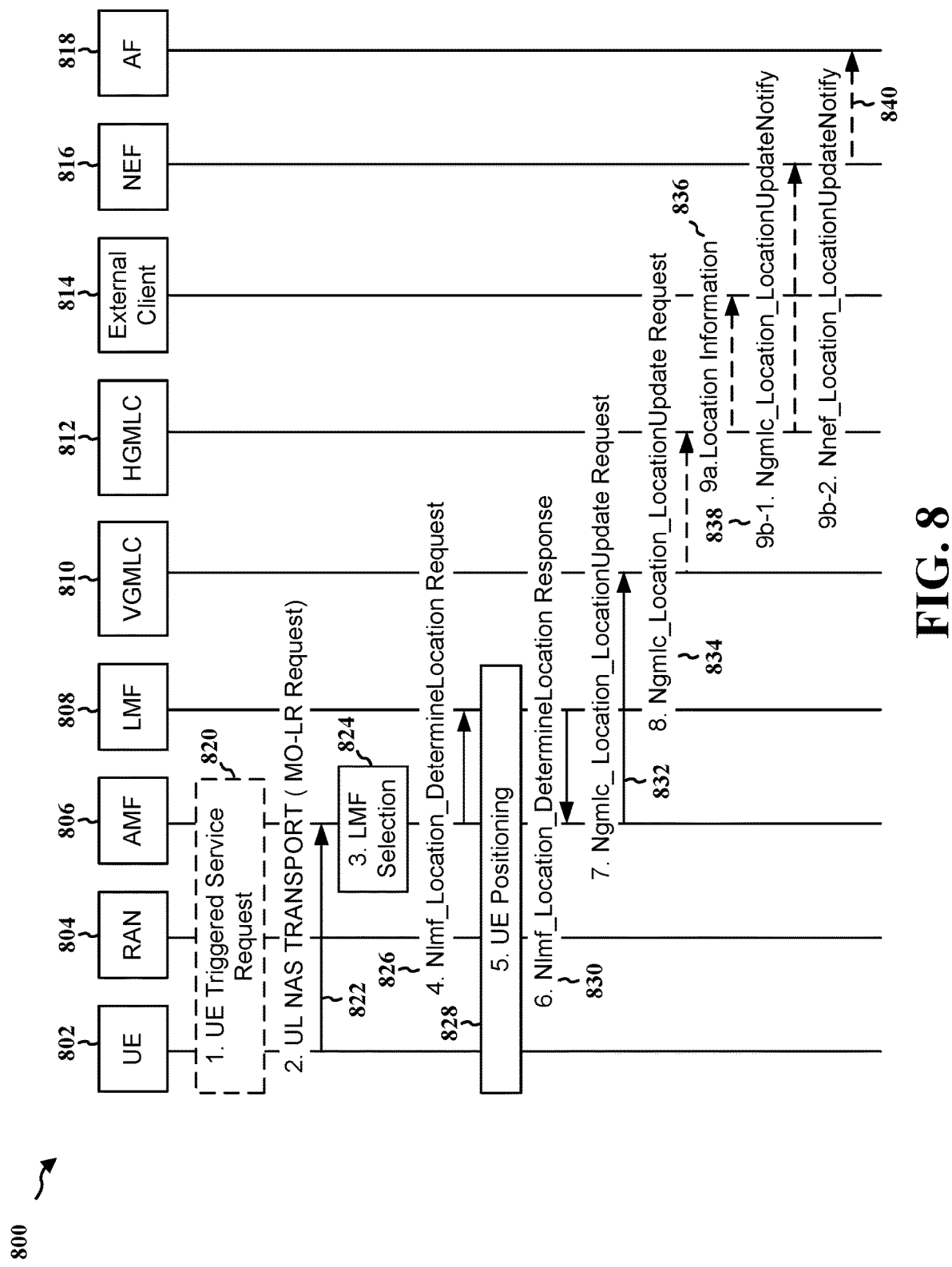
FIG. 8 is a communication flow illustrating an example mobile originated location requests (MO-LR) procedure in accordance with various aspects of the present disclosure.
Figure 9:
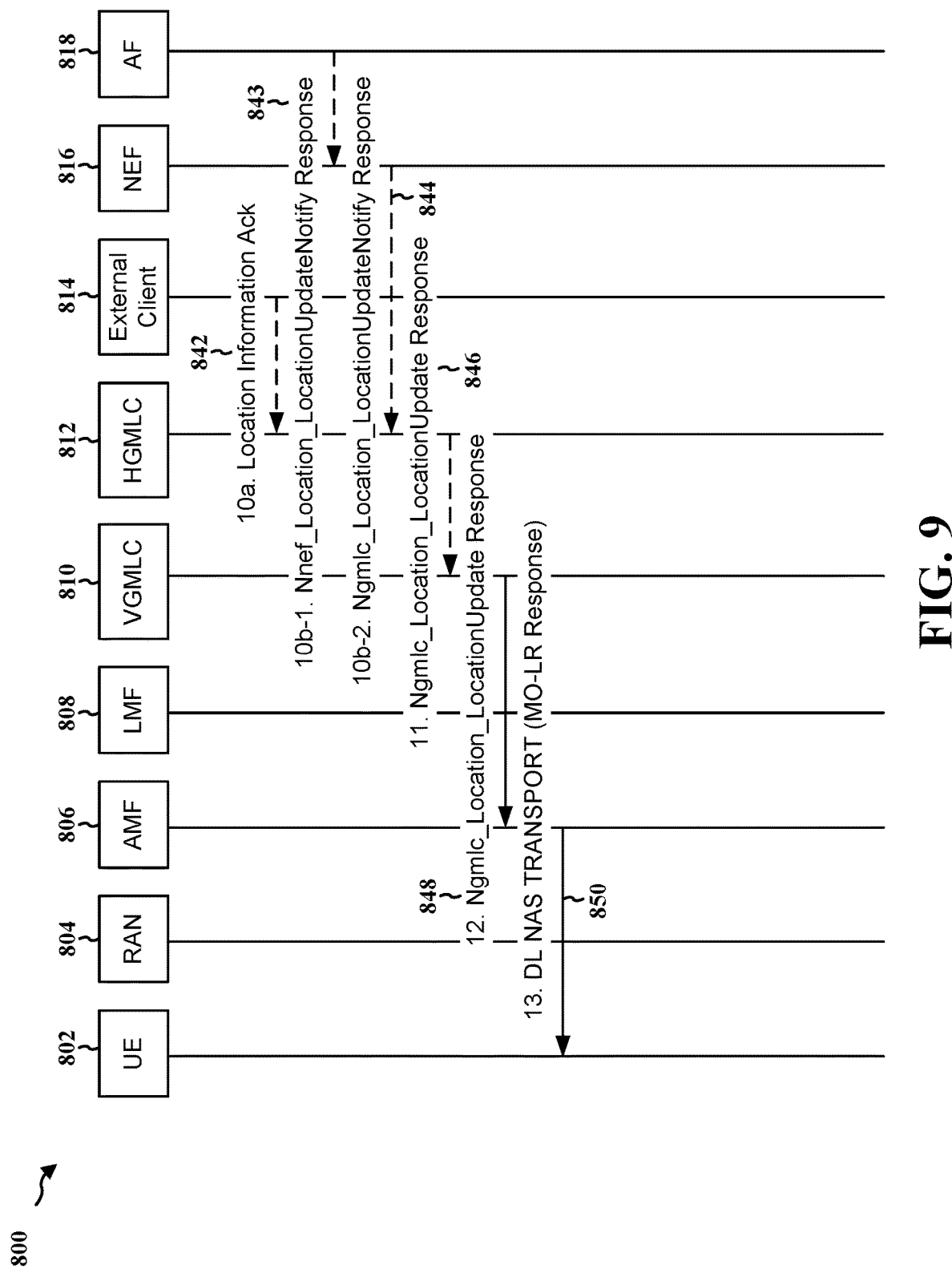
FIG. 9 is a communication flow illustrating an example MO-LR procedure in accordance with various aspects of the present disclosure.

FIGS. 8 and 9 are a communication flow 800 illustrating an example mobile originated location requests (MO-LR) procedure (e.g., UE-based positioning) in accordance with various aspects of the present disclosure. The numberings associated with the communication flow 800 do not specify a particular temporal order and are merely used as references for the communication flow 800. Aspects presented herein provide a general network positioning requested by a UE to a serving PLMN for obtaining the location related information of itself or just assistance data.

At 820, if a UE 802 is in a CM-IDLE state, the UE 802 may instigate a UE triggered service request to establish a signaling connection with an AMF 806.

At 822, the UE 802 may send an MO-LR request message included in an uplink (UL) non-access stratum (NAS) transport message. The MO-LR request may optionally include up to three LPP positioning message(s). Different types of location services may be requested: location estimate of the UE 802, location estimate of the UE 802 to be sent to an LCS client 814 or an AF 818, or location assistance data. If the UE 802 is requesting its own location or that its own location be sent to the LCS client 814 or the AF 818, this message may carry LCS requested QoS information (e.g., accuracy, response time, LCS QoS Class), the requested maximum age of location, the requested type of location (e.g., "current location" or "current or last known location") and, optionally for a current location, a scheduled location time. If the UE 802 is requesting that its location be sent to the LCS client 814, the message may include the identity of the LCS client 814 or the AF 818, and may include the address of a GMLC through which the LCS client 814 or the AF 818 (via a network exposure function (NEF) 816) may be accessed. In addition, a service type indicates which MO-LR service of the LCS client is requested by the UE 802 may be included. The message also may include a pseudonym indicator to indicate a pseudonym may be assigned by the network and transferred to the LCS client as the UE 802's identity. If the UE 802 is instead requesting location assistance data, the embedded LPP message may specify the type of assistance data and the positioning method for which the assistance data applies.

For an LCS MO-LR requesting location transfer to the LCS client 814 or the AF 818, the AMF 806 may assign a GMLC address, e.g., a visited GMLC (VGMLC) address, which is stored in the AMF 806. If a VGMLC address is not available, the AMF 806 may reject the location request. The AMF 806 may verify the subscription profile of the UE 802 and decide if the requested service is allowed or not by checking the mobile originated data retrieved from UDM during a UE registration procedure.

If the requested type of location is "current or last known location" and the requested maximum age of location information is available, the AMF 806 may verify whether it stores the previously obtained location estimate and related timestamp (if available) of the target UE 802. If the AMF 806 stores the location estimate and the related timestamp (if available) and the location estimate satisfies the requested accuracy and the requested maximum age of the location, the AMF 806 may skip steps described at 824, 826, 828, and 830.

At 824, the AMF 806 may select an LMF 808. The LMF selection may take the 5G-AN (e.g., a RAN 804) currently serving the UE 802 into account. The selection may use an NRF query.

At 826, the AMF 806 may invoke a Nlmf_Location_DetermineLocation service operation towards the LMF 808. The service operation may include an LCS correlation identifier, the serving cell identity, the client type, an indication whether a location estimate, or location assistance data is specified, UE positioning capability if available, a list of MO-LR subscribed assistance data and any embedded LPP message(s) in the MO-LR request. If the UE 802's location is requested, the service request may include an indication if UE 802 supports LPP, the requested QoS, supported GAD shapes and any scheduled location time. If location assistance data is requested, the embedded LPP message(s) will convey the requested types of location assistance data. In some examples, the service operation may also include the identity of the AMF 806. Once an AMF has selected an LMF, the AMF may be specified to continue to use that LMF for the duration of the session. In one example, if the UE 802 is requesting its own location, AMF 806 may not indicate support of a GAD shape for local co-ordinates.

At 828, if the UE 802 is requesting its own location, certain actions may be performed together with other actions if a scheduled location time is present. If the UE 802 is instead requesting location assistance data, the LMF 808 may transfer this data to the UE 802. The LMF 808 may determine the exact location assistance data to transfer according to the type of data specified by the UE 802, the UE 802 location capabilities, the MO-LR subscribed assistance data and the current cell.

At 830, when a location estimate best satisfying the requested QoS has been obtained or when the requested location assistance data has been transferred to the UE 802, the LMF 808 may return the Nlmf_Location_DetermineLocation Response towards the AMF 806. The service operation may include the LCS Correlation identifier, the location estimate, if this was obtained, its age and accuracy and may include information about the positioning method. If a location estimate was not successfully obtained, or if the requested location assistance data could not be transferred successfully to the UE 802, a failure cause may be included in the service operation. The service operation may also include the UE positioning capability if the UE positioning capability is received at 828 including an indication that the capabilities are non-variable and not received from AMF 806 at 826. If the UE 802 is requesting location assistance data, steps described in connection with 832 to 848 may be skipped.

At 832, if the location estimate was successfully obtained, the AMF 806 may invoke the Ngmlc_Location_LocationUpdate service operation towards to a VGMLC 810 assigned at 822. The service operation may carry the identity of the UE 802, the event causing the location estimate (MO-LR) and the location estimate, its age, obtained accuracy indication and the LCS QoS class requested by the target UE 802. In addition, the service operation may include the pseudonym indicator, the identity of the LCS client 814, AF ID, the GMLC address, the timestamp of the location estimate and the service type specified by the UE 802, if available.

At 834, if the UE 802 did not request transfer of its location to an LCS client 814 or the AF 818 at 822, steps described in connection with 834 to 846 may be skipped. If the VGMLC 810 is same NF instance as a home GMLC (HGMLC) 812 this step may be skipped. Otherwise VGMLC 810 may invoke the Ngmlc_Location_LocationUpdate service operation towards to the HGMLC 812 (the VGMLC 810 may query an NRF to obtain the address of the HGMLC 812) including the information received from the AMF 806.

At 836, if the pseudonym indicator is included in the MO-LR location information, the HGMLC 812 may assign a pseudonym to the UE 802. If the identified LCS client 814 is not accessible by the HGMLC 812, step described in connection with 836 and 842 may be skipped. Otherwise the GMLC may transfer the location information to the LCS client 814, carrying the identity or the pseudonym of the UE 802, the event causing the location estimate (MO-LR), the service identity, if available, and the location estimate, the timestamp of the location estimate (if available) and its age, in accordance with the LCS QoS class requested by the target UE 802. If the UE 802 requested LCS QoS class was assured, GMLC may send the result to the LCS client 814 if the result has been indicated to fulfil the requested accuracy. If the UE 802 requested LCS QoS class was best effort, GMLC may send whatever result it received to the LCS client 814 with an appropriate indication if the requested accuracy was not met. In some examples, the HGMLC 812 may map service type identity received at 834 into a service identity.

At 838, if an ID of the AF 818 is included at 820, the HGMLC 812 may assign the address of the NEF 816 based on local configuration or via NRF and invoke Ngmlc_Location_LocationUpdateNotify service request towards the NEF 816, carrying the AF ID. The location information parameters sent within this service operation may be the same as described at 826 except that no pseudonym is included.

At 840, if the identified AF 818 is not accessible by the NEF 816, steps described at 840 and 843 may be skipped. Otherwise, the NEF 816 may transfer the location information to the identified AF 818 by invoking the Nnef_Location_LocationUpdateNotify service.

At 842, if the LCS client 814 does not support MO-LR (for temporary or permanent reasons) or cannot handle the location estimate of the UE 802, e.g., the LCS client 814 does not know the service identity, or the UE 802 does not register to the LCS client 814, the LCS client 814 has no corresponding data of the UE 802, the LCS client 814 may return the location information acknowledgement message to the HGMLC 812 with a suitable error cause. Otherwise, the LCS client 814 may handle the location estimate according to the service identity, send the GMLC or the HGMLC 812 the location information acknowledgement message signaling that the location estimate of the UE 802 has been handled successfully.

At 843, if the AF 818 cannot handle the location estimate of the UE 802, e.g., the UE 802 does not register to the AF 818, the AF 818 has no corresponding data of the UE 802, the AF 818 may respond to the Nnef_Location_LocationUpdateNotify service request with a suitable error cause. Otherwise, the AF 818 may handle the location estimate according to the service identity and respond to the Nnef_Location_LocationUpdateNotify service request indicating that the location estimate of the UE 802 has been handled successfully.

At 844, the NEF 816 may send a Ngmlc_Location_LocationUpdateNotify service response towards the HGMLC 812 with the outcome of the operation.

At 846, if the VGMLC 810 is the same NF instance as the HGMLC 812 this step may be skipped. If the identified LCS client 814 or the AF 818 is not accessible, the HGMLC 812 may send a Ngmlc_Location_LocationUpdate service response to the VGMLC 810 with an appropriate error cause. Otherwise, the response may include an acknowledgement. The message may specify whether the location estimate of the UE 802 has been handled successfully by the identified LCS client 814 or AF 818, and if not, the corresponding error cause obtained at 824 to 844. In addition, the HGMLC 812 may record charging information both for the UE 802 and inter-working revenues charges.

At 848, if the VGMLC 810 receives the MO-LR location information acknowledgement from the HGMLC 812, if the identified LCS client 814 or the AF 818 is not accessible, the VGMLC 810 may send a Ngmlc_Location_LocationUpdate service response to AMF 806 with an appropriate error cause. Otherwise, the response may include an acknowledgement. The message may specify whether the location estimate of the UE 802 has been handled successfully by the identified LCS client 814 or the AF 818, and if not, the corresponding error cause obtained from 836 to 844. In addition, the VGMLC 810 may record charging information both for the UE 802 and inter-working revenue charges.

If the VGMLC 810 receives Ngmlc_Location_LocationUpdate Request from the AMF 806 and it is not specified to send to any LCS client or the AF 818, the VGMLC 810 may record charging information for the UE 802 and response the Ngmlc_Location_LocationUpdate Request to the AMF 806.

At 850, the AMF 806 may send an MO-LR response message included in a DL NAS transport message. If the UE 802 is requesting its own location, the response may carry any location estimate requested by the UE 802 and the timestamp of the location estimate (if available) including the indication received from LMF 808 whether the obtained location estimate satisfies the requested accuracy or not, or an indicator whether a location estimate was successfully transferred to the identified LCS client 814 or the AF 818. If the location estimate was successfully transferred to the identified LCS client 814 or the AF 818, the MO-LR response message may specify whether the location estimate of the UE 802 has been handled successfully by the identified LCS client 814 or AF 818, and if not, the corresponding error cause obtained in step 13. In addition, AMF 806 may record charging information.

Aspects presented herein may improve the efficiency, accuracy, and/or latency of a UE positioning procedure by enabling mobility analytics associated with a UE or a set of UEs to be exchanged between a location server and an NWDAF, either directly or via another network entity. For example, in one aspect of the present disclosure, mobility analytics associated with a UE or a set of UEs may be exchanged between an LMF and an AMF that is associated or communicating with an NWDAF, or between an LMF and an NWDAF for improving location services.

In one aspect, an LMF may request and receive the mobility analytics to design different assistance data for a group of UEs identified by the mobility analytics function. For example, the LMF may get input that the NWDAF has identified a group of UEs in a train, and the LMF may send to all UEs within the group of UEs the same assistance data. The assistance data may indicate which TRPs, PRS resource sets, PRS resources to include, and/or the priority used in the assistance data.

In another aspect, an LMF participates in a sidelink positioning session may setup an SL-grouping, and uses the group of UEs reported by an NWDAF to determine a set of UEs that are likely to be moving together.

In another aspect, the LMF may use the "prediction mobility statistics" for a UE or group of UEs to assign assistance data for upcoming areas according to the provided predictions.

In another aspect, the LMF may use the "prediction mobility statistics" for picking, configuring, and/or initiating one or more of the followings: positioning method(s), positioning technology(ies), pre-configuration of measurement gaps, pre-configuration of positioning processing windows, UE-based vs UE-assisted mode of operation/positioning, expected RSTD window(s), and/or expected AoD/AoA window(s), etc.

Figure 10:
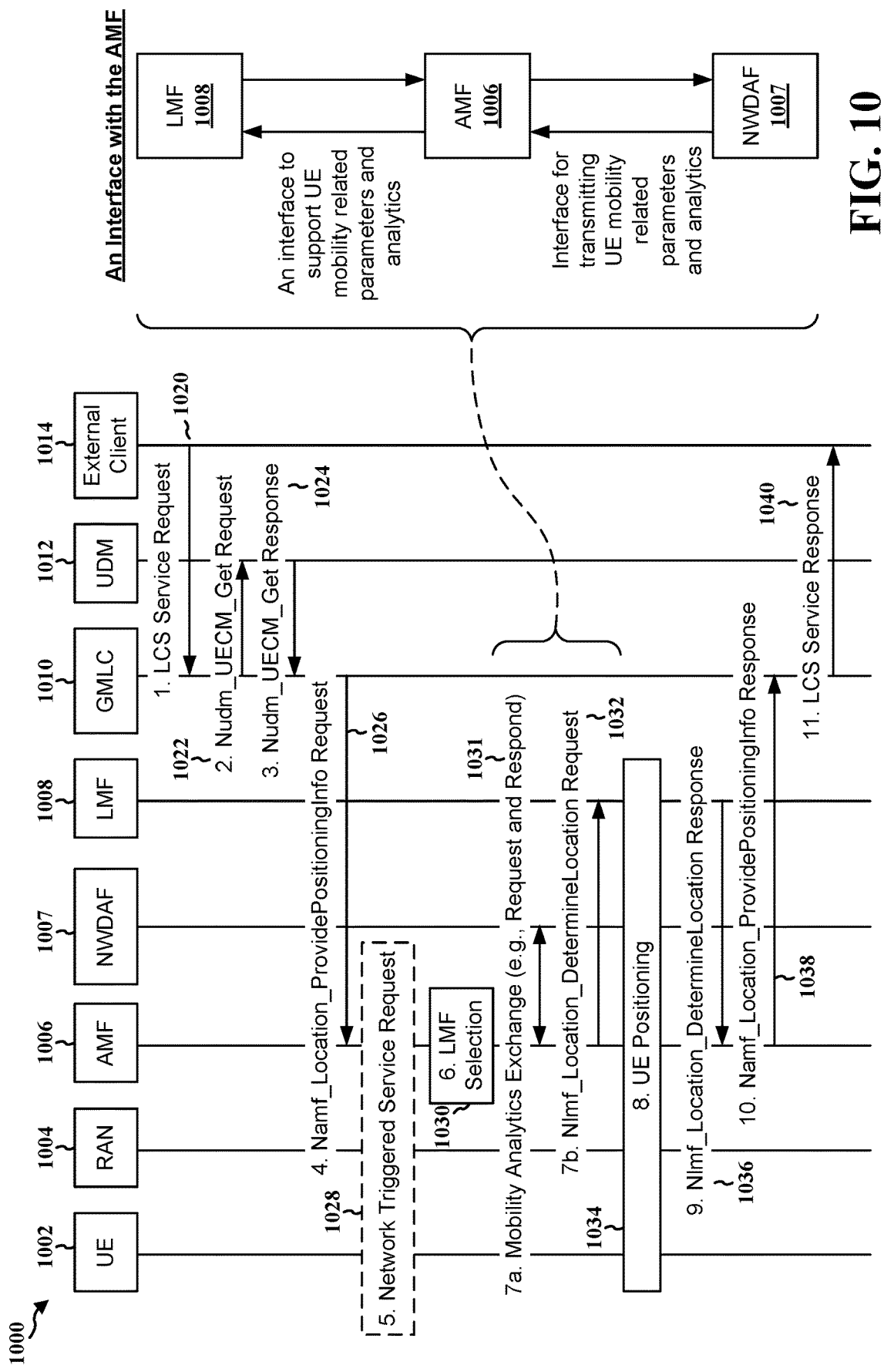
FIG. 10 is a communication flow illustrating an example MT-LR procedure for location service in accordance with various aspects of the present disclosure.

FIG. 10 is a communication flow 1000 illustrating an example MT-LR procedure for location service in accordance with various aspects of the present disclosure. The numberings associated with the communication flow 1000 do not specify a particular temporal order and are merely used as references for the communication flow 1000. Aspects presented herein may enable an LMF to request and/or receive UE mobility analytics for a UE or a set of UEs via an AMF. For example, an interface associated with exchanging or passing UE mobility related parameters, analytics, and/or statistics may be established or defined between an LMF and an AMF, such that the AMF may obtain UE mobility related parameters, analytics, and/or statistics for a UE or a set of UEs from an NWDAF and pass them to the LMF. In one aspect, the UE mobility related parameters, analytics, and/or statistics may include mobility pattern of the UE based on subscription of the UE, statistics of the UE mobility, network local policy, UE speed acceleration and direction, or any combination of them. The statistics of the UE mobility may be historical or expected UE moving trajectory. Information provided by the UE mobility related parameters, analytics, and/or statistics may assist the LMF to define an improved set or an optimal set of assistance data for a UE or a set of UEs.

At 1020, an external location services client 1014 may send a request (e.g., an LCS service request) to a GMLC 1010 for a location for a UE 1002 identified by a GPSI or an SUPI. The request may include a specified QoS, supported GAD shapes and client type. If location is specified for more than one UE, the steps following below may be repeated and in that case the GMLC 1010 may verify whether the number of UEs in the LCS service request is equal to or less than the maximum target UE number of the LCS client. If maximum target UE number is exceeded, the GMLC 1010 may reject the LCS service request, the step 1022 to 1038 may be skipped, and then the GMLC 1010 may respond to the external location services client 1014 with a proper error cause at 1040 (e.g., via an LCS service response message).

At 1022, the GMLC 1010 may invoke a Nudm_UECM_Get service operation towards a home UDM 1012 of the UE 1002 to be located with the GPSI or SUPI of this UE 1002. The Nudm_UECM_Get Service Operation may be used by NFs (e.g., NEF, GMLC, SMSF) to retrieve registration information from an UDM, e.g., the NF ID where the UEs access and mobility management context or the PDU sessions context can be reached. The requesting NF may provide a UE ID the NF type is interested in. The Nudm_UECM_Get Service operation may use the UE ID and NF type to search for the registered NF which is returned to the requestor.

At 1024, the UDM 1012 may return network addresses of a current serving AMF 1006, such as via a Nudm_UECM_Get Response message.

At 1026, the GMLC 1010 may invoke a Namf_Location_ProvidePositioningInfo service operation towards the AMF 1006 to request the current location of the UE 1002. The service operation may include the SUPI, and client type may include the specified QoS and supported GAD shapes.

At 1028, if the UE 1002 is in a CM-IDLE state, the AMF 1006 may initiate a network triggered service request procedure to establish a signaling connection with the UE 1002.

At 1030, the AMF 1006 may select an LMF 1008 based on the available information or based on local configuration of the AMF 1006. The LMF selection may take the (e.g., a RAN 1004) currently serving the UE 1002 into account. The selection may use an NRF query.

At 1031, the AMF 1006 (or the LMF 1008 via the AMF 1006) may request an NWDAF 1007 to provide mobility analytics associated with the UE 1002 (or a group of UEs including the UE 1002), where the mobility analytics may include UE mobility related parameters, analytics, and/or statistics. For example, the mobility analytics may include the mobility pattern for the UE 1002, statistics of UE mobility for the UE 1002, a network local policy, historical movements for the UE 1002, predicted movements for the UE 1002, speed, acceleration, and/or direction for UE 1002, or a combination thereof. In response to the AMF 1006's request, the NWDAF 1007 may transmit the requested mobility analytics associated with the UE 1002 to the AMF 1006.

At 1032, the AMF 1006 may transmit or pass the mobility analytics associated with the UE 1002 to the LMF 1008. For example, the AMF 1006 may invoke the Nlmf_Location_DetermineLocation service operation towards the LMF 1008 to request the current location of the UE 1002, and the request may include the mobility analytics associated with the UE 1002. The service operation may include an LCS correlation identifier, the serving cell identity of the primary cell in a master RAN node and a primary cell in the secondary RAN node when available based on dual connectivity scenarios, and the client type may include an indication if UE 1002 supports LPP, the specified QoS and supported GAD shapes. In some examples, the service operation may also include the AMF 1006 identity.

At 1034, the LMF 1008 may perform one or more of the positioning procedures, such as described in connection with FIG. 4. The LMF 1008 may determine one or more parameters associated with the positioning procedure(s) performed based on the mobility analytics received from the AMF 1006 at 1032 to improve or optimize the assistance data configured for the UE 1002 (or for a group of UEs). Similarly, during this step, the LMF 1008 may use the Namf_Communication_N1N2MessageTransfer service operation to request the transfer of a positioning related N1 message to the UE 1002 or the transfer of a network positioning message to a serving NG-RAN (e.g., the RAN 1004) node (gNB or NG-eNB) for the UE 1002.

At 1036, the LMF 1008 may return the Nlmf_Location_DetermineLocation Response towards the AMF 1006 to return the current location of the UE 1002. The service operation may include the LCS correlation identifier, the location estimate, its age and accuracy and may include information about the positioning method.

In another aspect of the present disclosure, at 1036 or via a separate or an additional step, the LMF 1008 may be configured to update the UE mobility related parameter associated with the UE 1002 to the AMF 1006. For example, the updated UE mobility related parameter may include PRS TRP/resources detected with signal strength above or below a signal threshold (e.g., very strong, strong and week signal strength, etc.), mobility pattern of the UE if available (e.g., speed, acceleration, direction), line-of-sight (LOS) and/or non-line-of-sight (NLOS) condition with respect to serving and neighbor cells, multipath information related to serving and neighbor cells, Doppler estimate of the UE 1002, or a combination thereof. All this information may assist the AMF 1006 to define an optimal set of handover and redirection scenarios and/or provide better mobility management at the AMF 1006. In some examples, the AMF 1006 may also update this information to the NWDAF.

At 1038, the AMF 1006 may return the Namf_Location_ProvidePositioningInfo Response towards the GMLC 1010 (or a location retrieval function (LRF)) to return the current location of the UE 1002. The service operation may include the location estimate, its age and accuracy and may include information about the positioning method.

At 1040, the GMLC 1010 may send the location service response (e.g., via an LCD service response message) to the external location services client 1014.

In another aspect of the present disclosure, aspects described herein, such as steps described in connection with 1031, 1032, and 1034, may also be applied to the MO-LR procedure described in connection with FIGS. 8 and 9. For example, referring back to FIG. 8, prior to sending the Nlmf_Location_DetermineLocation Request at 826, the AMF 806 may communicate with an NWDAF to obtain mobility analytics associated with the UE 802. Then, at 826, the AMF 806 may pass the obtained mobility analytics to the LMF 808. Then, at 828, the LMF 808 may perform one or more of the positioning procedures for the UE 802, such as described in connection with FIG. 4. The LMF 808 may determine one or more parameters associated with the positioning procedure(s) performed based on the mobility analytics received from the AMF 806 at 826 to improve or optimize the assistance data configured for the UE 802 (or for a group of UEs).

Figure 11:
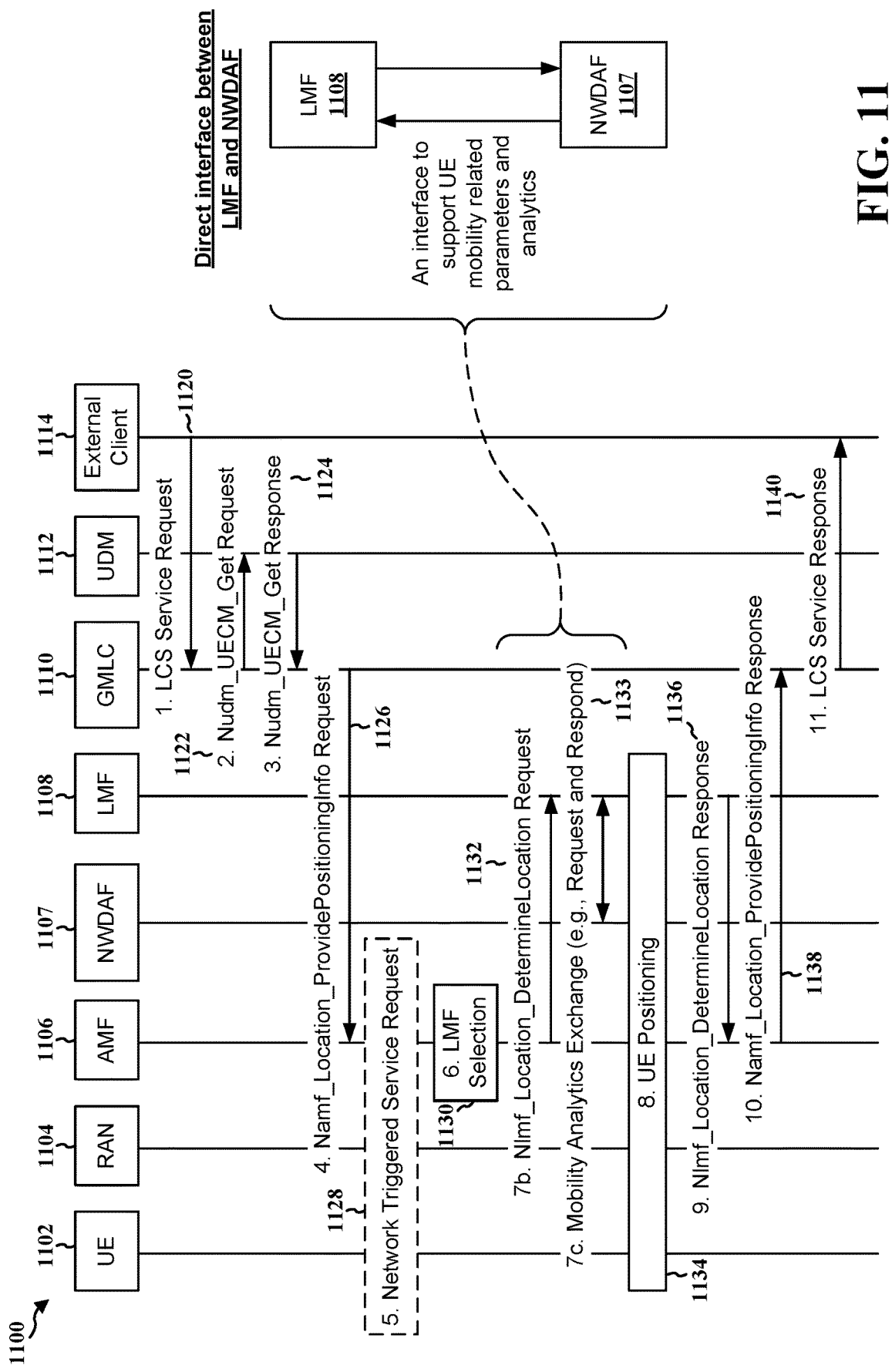
FIG. 11 is a communication flow 1100 illustrating an example MT-LR procedure for location service in accordance with various aspects of the present disclosure

FIG. 11 is a communication flow 1100 illustrating an example MT-LR procedure for location service in accordance with various aspects of the present disclosure. The numberings associated with the communication flow 1100 do not specify a particular temporal order and are merely used as references for the communication flow 1100. Aspects presented herein may enable an LMF to request and/or receive UE mobility analytics for a UE or a set of UEs from an NWDAF. For example, an interface associated with exchanging or passing UE mobility related parameters, analytics, and/or statistics may be established or defined between an LMF and an NWDAF, such that the LMF may obtain UE mobility related parameters, analytics, and/or statistics for a UE or a set of UEs from the NWDAF. In one aspect, the UE mobility related parameters, analytics, and/or statistics may include mobility pattern of the UE based on subscription of the UE, statistics of the UE mobility, network local policy, UE speed acceleration and direction, or any combination of them. The statistics of the UE mobility may be historical or expected UE moving trajectory. Information provided by the UE mobility related parameters, analytics, and/or statistics may assist the LMF to define an improved set or an optimal set of assistance data for a UE or a set of UEs.

At 1120, an external location services client 1114 may send a request (e.g., an LCS service request) to a GMLC 1110 for a location for a UE 1102 identified by a GPSI or an SUPI. The request may include a specified QoS, supported GAD shapes and client type. If location is specified for more than one UE, the steps following below may be repeated and in that case the GMLC 1110 may verify whether the number of UEs in the LCS service request is equal to or less than the maximum target UE number of the LCS client. If maximum target UE number is exceeded, the GMLC 1110 may reject the LCS service request, the step 1122 to 1138 may be skipped, and then the GMLC 1110 may respond to the external location services client 1114 with a proper error cause at 1140 (e.g., via an LCS service response message).

At 1122, the GMLC 1110 may invoke a Nudm_UECM_Get service operation towards a home UDM 1112 of the UE 1102 to be located with the GPSI or SUPI of this UE 1102. The Nudm_UECM_Get Service Operation may be used by NFs (e.g., NEF, GMLC, SMSF) to retrieve registration information from an UDM, e.g., the NF ID where the UEs access and mobility management context or the PDU sessions context can be reached. The requesting NF may provide a UE ID the NF type is interested in. The Nudm_UECM_Get Service operation may use the UE ID and NF type to search for the registered NF which is returned to the requestor.

At 1124, the UDM 1112 may return network addresses of a current serving AMF 1106, such as via a Nudm_UECM_Get Response message.

At 1126, the GMLC 1110 may invoke a Namf_Location_ProvidePositioningInfo service operation towards the AMF 1106 to request the current location of the UE 1102. The service operation may include the SUPI, and client type may include the specified QoS and supported GAD shapes.

At 1128, if the UE 1102 is in a CM-IDLE state, the AMF 1106 may initiate a network triggered service request procedure to establish a signaling connection with the UE 1102.

At 1130, the AMF 1106 may select an LMF 1108 based on the available information or based on local configuration of the AMF 1106. The LMF selection may take the 5G-AN (e.g., a RAN 1104) currently serving the UE 1102 into account. The selection may use an NRF query.

At 1132, the AMF 1106 may invoke the Nlmf_Location_DetermineLocation service operation towards the LMF 1108 to request the current location of the UE 1102. The service operation may include an LCS correlation identifier, the serving cell identity of the primary cell in a master RAN node and a primary cell in the secondary RAN node when available based on dual connectivity scenarios, and the client type may include an indication if UE 1102 supports LPP, the specified QoS and supported GAD shapes. In some examples, the service operation may also include the AMF 1106 identity.

At 1133, the LMF 1108 may request an NWDAF 1107 to provide mobility analytics associated with the UE 1102 (or a group of UEs including the UE 1102), where the mobility analytics may include UE mobility related parameters, analytics, and/or statistics. For example, the mobility analytics may include the mobility pattern for the UE 1102, statistics of UE mobility for the UE 1102, a network local policy, historical movements for the UE 1102, predicted movements for the UE 1102, speed, acceleration, and/or direction for UE 1102, or a combination thereof. In response to the LMF 1108's request, the NWDAF 1107 may transmit the requested mobility analytics associated with the UE 1102 to the AMF 1106 or to the LMF 1108. In some examples, prior to requesting the NWDAF 1107 to provide the mobility analytics, the LMF may first establish an interface with the NWDAF 1107.

At 1134, the LMF 1108 may perform one or more of the positioning procedures, such as described in connection with FIG. 4. The LMF 1108 may determine one or more parameters associated with the positioning procedure(s) performed based on the mobility analytics received from the NWDAF at 1133 to improve or optimize the assistance data configured for the UE 1102 (or for a group of UEs). Similarly, during this step, the LMF 1108 may use the Namf_Communication_N1N2MessageTransfer service operation to request the transfer of a positioning related N1 message to the UE 1102 or the transfer of a network positioning message to a serving NG-RAN (e.g., the RAN 1104) node (gNB or NG-eNB) for the UE 1102.

At 1136, the LMF 1108 may return the Nlmf_Location-_DetermineLocation Response towards the AMF 1106 to return the current location of the UE 1102. The service operation may include the LCS correlation identifier, the location estimate, its age and accuracy and may include information about the positioning method.

Similarly, in one example, at 1136 or via a separate or an additional step, the LMF 1108 may be configured to update the UE mobility related parameter associated with the UE 1102 to the AMF 1106. For example, the updated UE mobility related parameter may include PRS TRP/resources detected with signal strength above or below a signal threshold (e.g., very strong, strong and week signal strength, etc.), mobility pattern of the UE if available (e.g., speed, acceleration, direction), line-of-sight (LOS) and/or non-line-of-sight (NLOS) condition with respect to serving and neighbor cells, multipath information related to serving and neighbor cells, Doppler estimate of the UE 1102, or a combination thereof. All this information may assist the AMF 1106 to define an optimal set of handover and redirection scenarios and/or provide better mobility management at the AMF 1106.

At 1138, the AMF 1106 may return the Namf_Location-_ProvidePositioningInfo Response towards the GMLC 1110 (or a location retrieval function (LRF)) to return the current location of the UE 1102. The service operation may include the location estimate, its age and accuracy and may include information about the positioning method.

At 1140, the GMLC 1110 may send the location service response (e.g., via an LCD service response message) to the external location services client 1114.

In another aspect of the present disclosure, aspects described herein, such as steps described in connection with 1133 and 1134, may also be applied to the MO-LR procedure described in connection with FIGS. 8 and 9. For example, referring back to FIG. 8, after receiving the Nlmf_Location_DetermineLocation Request at 826, the LMF 808 may communicate with an NWDAF to obtain mobility analytics associated with the UE 802. Then, at 828, the LMF 808 may perform one or more of the positioning procedures for the UE 802, such as described in connection with FIG. 4. The LMF 808 may determine one or more parameters associated with the positioning procedure(s) performed based on the mobility analytics received from the NWDAF to improve or optimize the assistance data configured for the UE 802 (or for a group of UEs).

Figure 12:
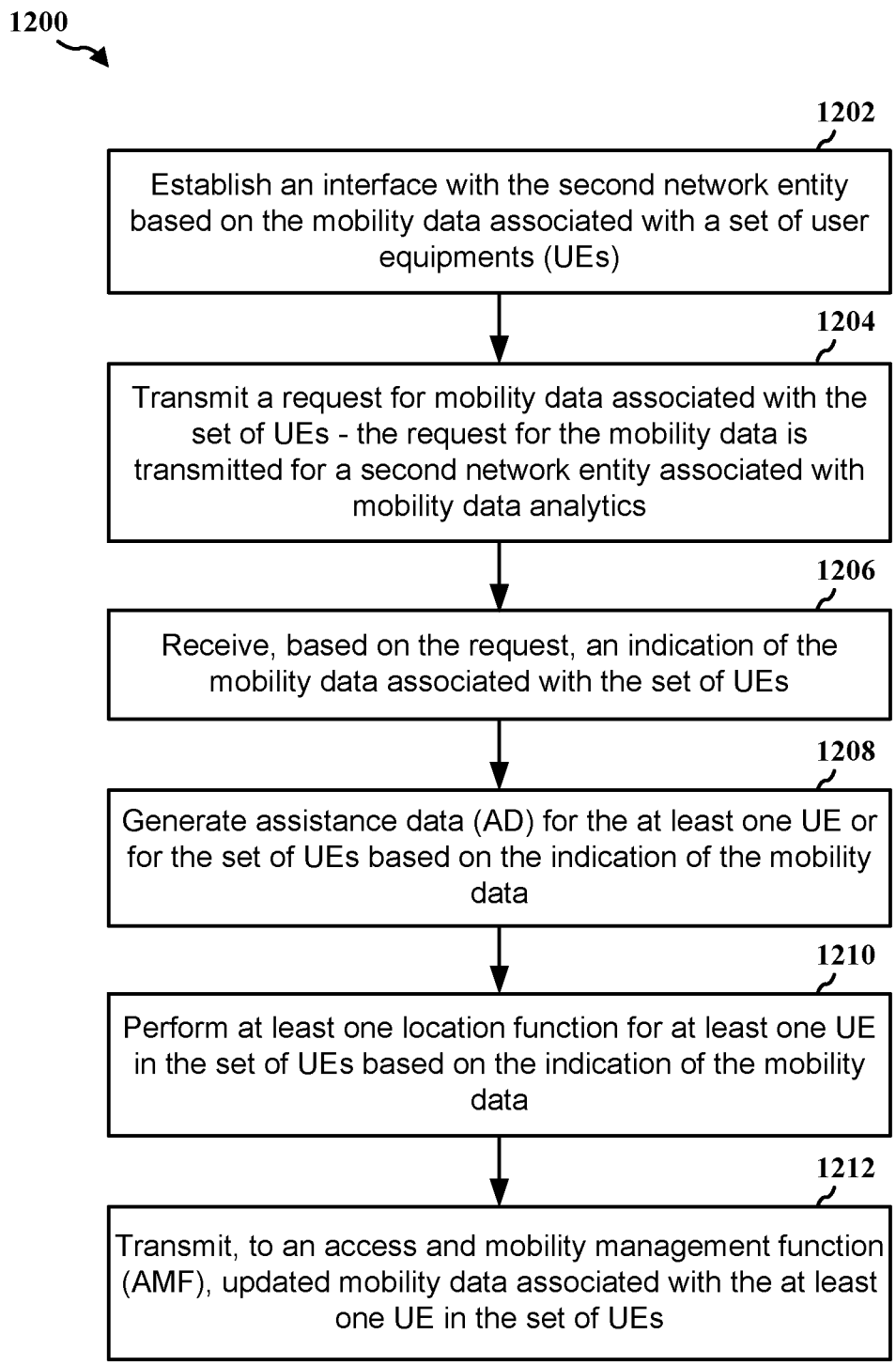
FIG. 12 is a flowchart of a method of wireless communication.

FIG. 12 is a flowchart 1200 of a method of wireless communication. The method may be performed by a first network entity (e.g., the LMF 708, 808, 1008, 1108; the network entity 1402). The method may enable the first network entity to request and receive mobility analytics for a set of UEs to improve location services.

At 1202, the first network entity may establish an interface with the second network entity based on mobility data associated with a set of UEs, such as described in connection with FIGS. 10 and 11. For example, at 1133 of FIG. 11, prior to request mobility analytics for the UE 1102, the LMF 1108 may establish an interface with the NWDAF 1107. The establishment of the interface may be performed by, e.g., the mobility analytics request component 199, the transceiver(s) 1446, and/or the communication interface 1418/1438/1448 of the network entity 1402 in FIG. 14.

At 1204, the first network entity may transmit a request for mobility data associated with the set of UEs, where the request for the mobility data is transmitted for a second network entity associated with mobility data analytics, such as described in connection with FIGS. 10 and 11. For example, at 1031 of FIG. 10, the LMF 1108 may transmit a request for mobile analytics associated with the UE 1002 from the NWDAF 1007 via the AMF 1006. The transmission of the request may be performed by, e.g., the mobility analytics request component 199, the transceiver(s) 1446, and/or the communication interface 1418/1438/1448 of the network entity 1402 in FIG. 14.

In one example, the mobility data associated with the set of UEs is at least one of mobility analytics associated with the set of UEs or a set of mobility parameters associated with the set of UEs.

In another example, the mobility data includes: a mobility pattern for the set of UEs, one or more statistics of UE mobility for the set of UEs, a network local policy, one or more historical movements for the set of UEs, one or more predicted movements for the set of UEs, at least one of speed, acceleration, or direction for the set of UEs, or a combination thereof.

In another example, the request for the mobility data is transmitted for the second network entity via a third network entity, and where the indication of the mobility data is received from the second network entity via the third network entity. In such an example, the first network entity is an LMF or a location server, the second network entity is an NWDAF, and the third network entity is an AMF.

In another example, the request for the mobility data is transmitted directly to the second network entity, and where the indication of the mobility data is received directly from the second network entity. In such an example, the first network entity is an LMF or a location server, and the second network entity is an NWDAF.

At 1206, the first network entity may receive, based on the request, an indication of the mobility data associated with the set of UEs, such as described in connection with FIGS. 10 and 11. For example, at 1032 of FIG. 10, the LMF may receive mobile analytics associated with the UE 1002 from the AMF 1006. The reception of the indication of the mobility data may be performed by, e.g., the mobility analytics request component 199, the transceiver(s) 1446, and/or the communication interface 1418/1438/1448 of the network entity 1402 in FIG. 14.

At 1208, the first network entity may generate AD for the at least one UE or for the set of UEs based on the indication of the mobility data, such as described in connection with FIGS. 10 and 11. For example, at 1034 of FIG. 10, the LMF 1008 may determine one or more parameters associated with the positioning procedure(s) performed based on the mobility analytics received from the AMF 1006 at 1032 to improve or optimize the assistance data configured for the UE 1002 (or for a group of UEs). The generation of the AD may be performed by, e.g., the mobility analytics request component 199, the transceiver(s) 1446, and/or the communication interface 1418/1438/1448 of the network entity 1402 in FIG. 14.

At 1210, the first network entity may perform at least one location function for at least one UE in the set of UEs based on the indication of the mobility data, such as described in connection with FIGS. 10 and 11. For example, at 1034 of FIG. 10, the LMF 1008 may perform one or more of the positioning procedures for the UE 1002. The at least one location function may be performed by, e.g., the mobility analytics request component 199, the transceiver(s) 1446, and/or the communication interface 1418/1438/1448 of the network entity 1402 in FIG. 14.

In one example, the first network entity may determine which TRPs, PRS resources sets, or PRS resources to include for the at least one UE or for the set of the UEs based on the indication of the mobility data.

In another example, the first network entity may select a group of UEs from the set of UEs for an SL positioning session based on the indication of the mobility data.

In another example, the first network entity may determine, for the at least one UE or for the set of the UEs, at least one of: at least one positioning method, at least one positioning technology, a pre-configuration of measurement gaps, a pre-configuration of positioning processing windows, a UE-based or UE-assisted mode of operation, at least one expected RSTD window, at least one expected AoD window, at least one expected AoA window, or a combination thereof based on the indication of the mobility data.

At 1212, the first network entity may transmit, to an AMF, updated mobility data associated with the at least one UE in the set of UEs, such as described in connection with FIGS. 10 and 11. For example, at 1036 of FIG. 10, the LMF 1008 may be configured to update the UE mobility related parameter associated with the UE 1002 to the AMF 1006. The transmission of the updated mobility data may be performed by, e.g., the mobility analytics request component 199, the transceiver(s) 1446, and/or the communication interface 1418/1438/1448 of the network entity 1402 in FIG. 14. In one example, the updated mobility data includes: PRS resources or TRP resources with a signal strength above or below a signal threshold for the at least one UE; a mobility pattern for the at least one UE, an LOS and NLOS condition with respect to a serving cell and one or more neighboring cells for the at least one UE, multipath information related to the serving cell and the one or more neighboring cells for the at least one UE, Doppler estimation for the at least one UE, or a combination thereof. In another example, the updated mobility data is forwarded to the second network entity via the AMF.

Figure 13:
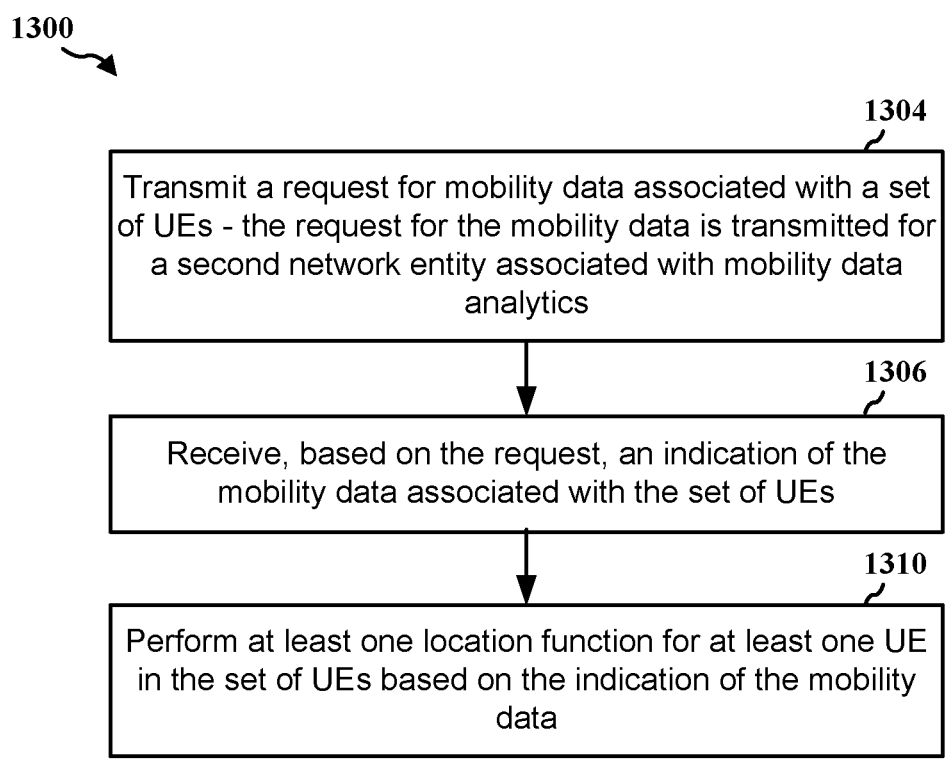
FIG. 13 is a flowchart of a method of wireless communication.

FIG. 13 is a flowchart 1300 of a method of wireless communication. The method may be performed by a first network entity (e.g., the LMF 708, 808, 1008, 1108; the network entity 1402). The method may enable the first network entity to request and receive mobility analytics for a set of UEs to improve location services.

At 1304, the first network entity may transmit a request for mobility data associated with the set of UEs, where the request for the mobility data is transmitted for a second network entity associated with mobility data analytics, such as described in connection with FIGS. 10 and 11. For example, at 1031 of FIG. 10, the LMF 1108 may transmit a request for mobile analytics associated with the UE 1002 from the NWDAF 1007 via the AMF 1006. The transmission of the request may be performed by, e.g., the mobility analytics request component 199, the transceiver(s) 1446, and/or the communication interface 1418/1438/1448 of the network entity 1402 in FIG. 14.

In one example, the first network entity may establish an interface with the second network entity based on mobility data associated with a set of UEs, such as described in connection with FIGS. 10 and 11. For example, at 1133 of FIG. 11, prior to request mobility analytics for the UE 1102, the LMF 1108 may establish an interface with the NWDAF 1107. The establishment of the interface may be performed by, e.g., the mobility analytics request component 199, the transceiver(s) 1446, and/or the communication interface 1418/1438/1448 of the network entity 1402 in FIG. 14.

In another example, the mobility data associated with the set of UEs is at least one of mobility analytics associated with the set of UEs or a set of mobility parameters associated with the set of UEs.

In another example, the mobility data includes: a mobility pattern for the set of UEs, one or more statistics of UE mobility for the set of UEs, a network local policy, one or more historical movements for the set of UEs, one or more predicted movements for the set of UEs, at least one of speed, acceleration, or direction for the set of UEs, or a combination thereof.

In another example, the request for the mobility data is transmitted for the second network entity via a third network entity, and where the indication of the mobility data is received from the second network entity via the third network entity. In such an example, the first network entity is an LMF or a location server, the second network entity is an NWDAF, and the third network entity is an AMF.

In another example, the request for the mobility data is transmitted directly to the second network entity, and where the indication of the mobility data is received directly from the second network entity. In such an example, the first network entity is an LMF or a location server, and the second network entity is an NWDAF.

At 1306, the first network entity may receive, based on the request, an indication of the mobility data associated with the set of UEs, such as described in connection with FIGS. 10 and 11. For example, at 1032 of FIG. 10, the LMF may receive mobile analytics associated with the UE 1002 from the AMF 1006. The reception of the indication of the mobility data may be performed by, e.g., the mobility analytics request component 199, the transceiver(s) 1446, and/or the communication interface 1418/1438/1448 of the network entity 1402 in FIG. 14.

In one example, the first network entity may generate AD for the at least one UE or for the set of UEs based on the indication of the mobility data, such as described in connection with FIGS. 10 and 11. For example, at 1034 of FIG. 10, the LMF 1008 may determine one or more parameters associated with the positioning procedure(s) performed based on the mobility analytics received from the AMF 1006 at 1032 to improve or optimize the assistance data configured for the UE 1002 (or for a group of UEs). The generation of the AD may be performed by, e.g., the mobility analytics request component 199, the transceiver(s) 1446, and/or the communication interface 1418/1438/1448 of the network entity 1402 in FIG. 14.

At 1310, the first network entity may perform at least one location function for at least one UE in the set of UEs based on the indication of the mobility data, such as described in connection with FIGS. 10 and 11. For example, at 1034 of FIG. 10, the LMF 1008 may perform one or more of the positioning procedures for the UE 1002. The at least one location function may be performed by, e.g., the mobility analytics request component 199, the transceiver(s) 1446, and/or the communication interface 1418/1438/1448 of the network entity 1402 in FIG. 14.

In one example, the first network entity may determine which TRPs, PRS resources sets, or PRS resources to include for the at least one UE or for the set of the UEs based on the indication of the mobility data.

In another example, the first network entity may select a group of UEs from the set of UEs for an SL positioning session based on the indication of the mobility data.

In another example, the first network entity may determine, for the at least one UE or for the set of the UEs, at least one of: at least one positioning method, at least one positioning technology, a pre-configuration of measurement gaps, a pre-configuration of positioning processing windows, a UE-based or UE-assisted mode of operation, at least one expected RSTD window, at least one expected AoD window, at least one expected AoA window, or a combination thereof based on the indication of the mobility data.

In another example, the first network entity may transmit, to an AMF, updated mobility data associated with the at least one UE in the set of UEs, such as described in connection with FIGS. 10 and 11. For example, at 1036 of FIG. 10, the LMF 1008 may be configured to update the UE mobility related parameter associated with the UE 1002 to the AMF 1006. The transmission of the updated mobility data may be performed by, e.g., the mobility analytics request component 199, the transceiver(s) 1446, and/or the communication interface 1418/1438/1448 of the network entity 1402 in FIG. 14. In one example, the updated mobility data includes: PRS resources or TRP resources with a signal strength above or below a signal threshold for the at least one UE; a mobility pattern for the at least one UE, an LOS and NLOS condition with respect to a serving cell and one or more neighboring cells for the at least one UE, multipath information related to the serving cell and the one or more neighboring cells for the at least one UE, Doppler estimation for the at least one UE, or a combination thereof. In another example, the updated mobility data is forwarded to the second network entity via the AMF.

Figure 14:
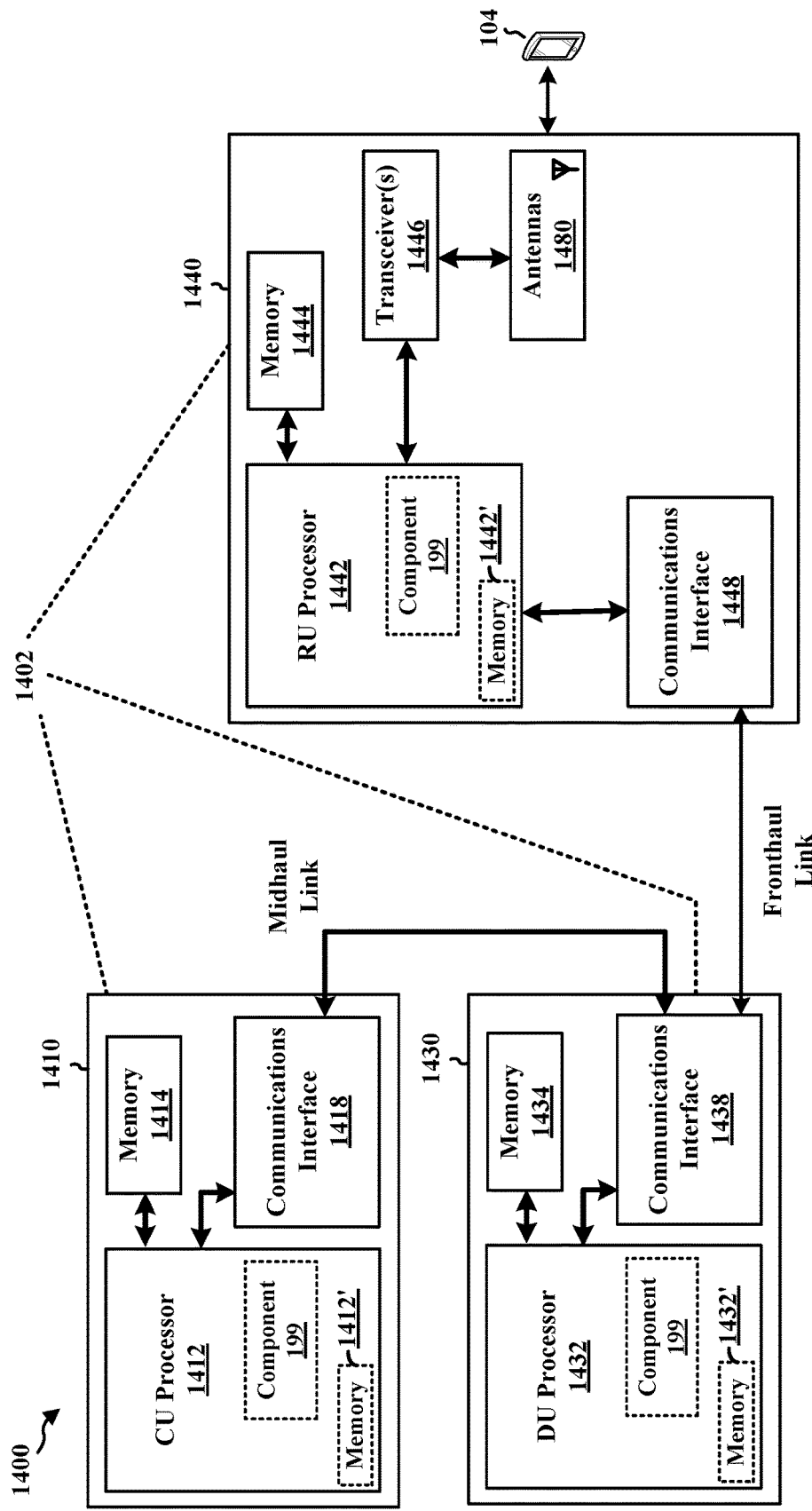
FIG. 14 is a diagram illustrating an example of a hardware implementation for an example apparatus and/or network entity.

FIG. 14 is a diagram 1400 illustrating an example of a hardware implementation for a network entity 1402. The network entity 1402 may be an LMF, a component of an LMF, or may implement LMF functionality. The network entity 1402 may include at least one of a CU 1410, a DU 1430, or an RU 1440. For example, depending on the layer functionality handled by the mobility analytics request component 199, the network entity 1402 may include the CU 1410; both the CU 1410 and the DU 1430; each of the CU 1410, the DU 1430, and the RU 1440; the DU 1430; both the DU 1430 and the RU 1440; or the RU 1440. The CU 1410 may include a CU processor 1412. The CU processor 1412 may include on-chip memory 1412'. In some aspects, the CU 1410 may further include additional memory modules 1414 and a communications interface 1418. The CU 1410 communicates with the DU 1430 through a midhaul link, such as an F1 interface. The DU 1430 may include a DU processor 1432. The DU processor 1432 may include on-chip memory 1432'. In some aspects, the DU 1430 may further include additional memory modules 1434 and a communications interface 1438. The DU 1430 communicates with the RU 1440 through a fronthaul link. The RU 1440 may include an RU processor 1442. The RU processor 1442 may include on-chip memory 1442'. In some aspects, the RU 1440 may further include additional memory modules 1444, one or more transceivers 1446, antennas 1480, and a communications interface 1448. The RU 1440 communicates with the UE 104. The on-chip memory 1412', 1432', 1442' and the additional memory modules 1414, 1434, 1444 may each be considered a computer-readable medium/memory. Each computer-readable medium/memory may be non-transitory. Each of the processors 1412, 1432, 1442 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the mobility analytics request component 199 may be configured to transmit a request for mobility data associated with a set of UEs, where the request for the mobility data is transmitted for a second network entity associated with mobility data analytics. The mobility analytics request component 199 may also be configured to receive, based on the request, an indication of the mobility data associated with the set of UEs. The mobility analytics request component 199 may also be configured to perform at least one location function for at least one UE in the set of UEs based on the indication of the mobility data. The mobility analytics request component 199 may be within one or more processors of one or more of the CU 1410, DU 1430, and the RU 1440. The mobility analytics request component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1402 may include a variety of components configured for various functions. In one configuration, the network entity 1402 may include means for transmitting a request for mobility data associated with a set of UEs, where the request for the mobility data is transmitted for a second network entity associated with mobility data analytics. The network entity 1402 may further include means for receiving, based on the request, an indication of the mobility data associated with the set of UEs. The network entity 1402 may further include means for performing at least one location function for at least one UE in the set of UEs based on the indication of the mobility data.

In one configuration, the network entity 1402 may further include means for establishing an interface with the second network entity based on mobility data associated with a set of UEs.

In another configuration, the mobility data associated with the set of UEs is at least one of mobility analytics associated with the set of UEs or a set of mobility parameters associated with the set of UEs.

In another configuration, the mobility data includes: a mobility pattern for the set of UEs, one or more statistics of UE mobility for the set of UEs, a network local policy, one or more historical movements for the set of UEs, one or more predicted movements for the set of UEs, at least one of speed, acceleration, or direction for the set of UEs, or a combination thereof.

In another configuration, the request for the mobility data is transmitted for the second network entity via a third network entity, and where the indication of the mobility data is received from the second network entity via the third network entity. In such a configuration, the first network entity is an LMF or a location server, the second network entity is an NWDAF, and the third network entity is an AMF.

In another configuration, the request for the mobility data is transmitted directly to the second network entity, and where the indication of the mobility data is received directly from the second network entity. In such a configuration, the first network entity is an LMF or a location server, and the second network entity is an NWDAF.

In another configuration, the network entity 1402 may further include means for generating AD for the at least one UE or for the set of UEs based on the indication of the mobility data.

In another configuration, the network entity 1402 may further include means for determining which TRPs, PRS resources sets, or PRS resources to include for the at least one UE or for the set of the UEs based on the indication of the mobility data.

In another configuration, the network entity 1402 may further include means for selecting a group of UEs from the set of UEs for an SL positioning session based on the indication of the mobility data.

In another configuration, the network entity 1402 may further include means for determining, for the at least one UE or for the set of the UEs, at least one of: at least one positioning method, at least one positioning technology, a pre-configuration of measurement gaps, a pre-configuration of positioning processing windows, a UE-based or UE-assisted mode of operation, at least one expected RSTD window, at least one expected AoD window, at least one expected AoA window, or a combination thereof based on the indication of the mobility data.

In another configuration, the network entity 1402 may further include means for transmitting, to an AMF, updated mobility data associated with the at least one UE in the set of UEs. In one configuration, the updated mobility data includes: PRS resources or TRP resources with a signal strength above or below a signal threshold for the at least one UE; a mobility pattern for the at least one UE, an LOS and NLOS condition with respect to a serving cell and one or more neighboring cells for the at least one UE, multipath information related to the serving cell and the one or more neighboring cells for the at least one UE, Doppler estimation for the at least one UE, or a combination thereof. In another configuration, the updated mobility data is forwarded to the second network entity via the AMF.

The means may be the mobility analytics request component 199 of the network entity 1402 configured to perform the functions recited by the means. As described supra, the network entity 1402 may include the TX processor 316, the RX processor 370, and the controller/processor 375. As such, in one configuration, the means may be the TX processor 316, the RX processor 370, and/or the controller/processor 375 configured to perform the functions recited by the means.

Figure 15:
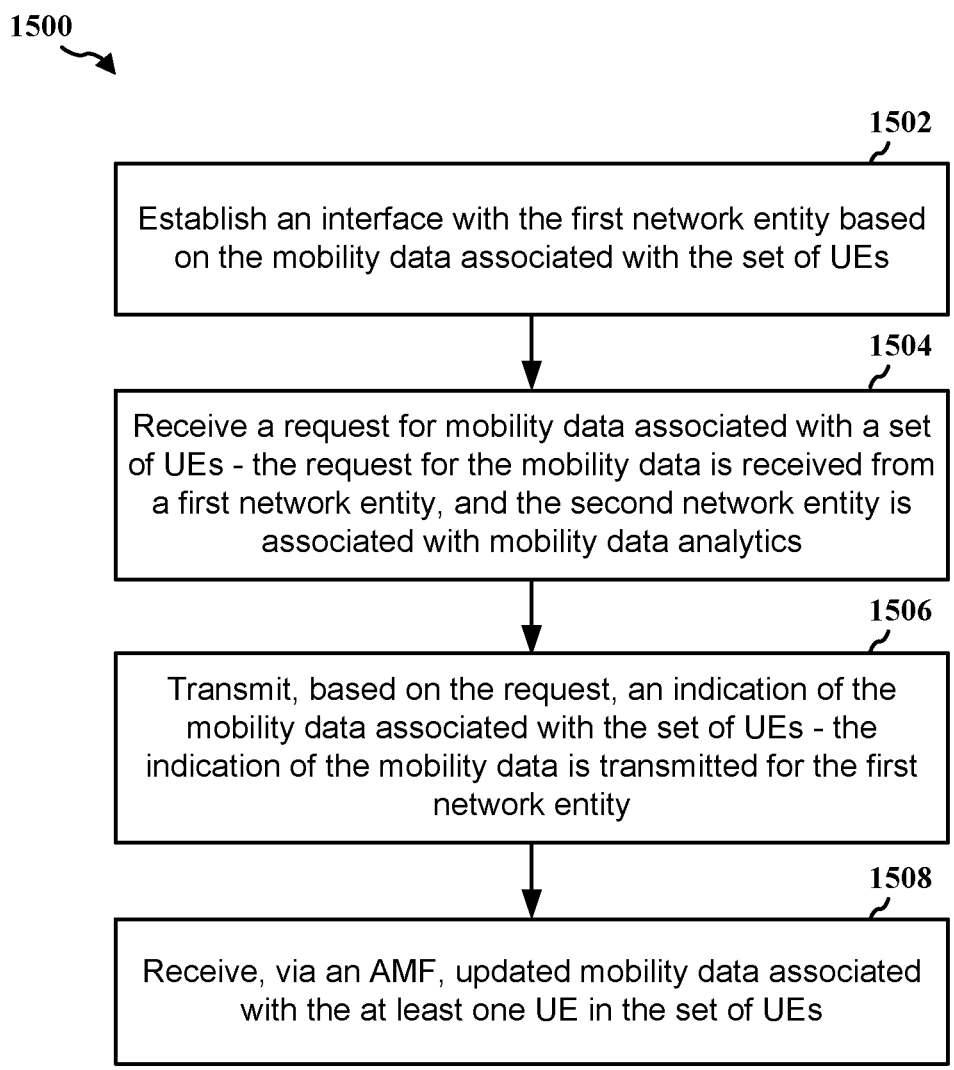
FIG. 15 is a flowchart of a method of wireless communication.

FIG. 15 is a flowchart 1500 of a method of wireless communication. The method may be performed by a second network entity (e.g., the NWDAF 196, 1007, 1107; the network entity 1702). The method may enable the second network entity to provide mobility analytics for a set of UEs to an LMF or a location server to improve location services.

At 1502, the second network entity may establish an interface with the first network entity based on the mobility data associated with the set of UEs, such as described in connection with FIGS. 10 and 11. For example, at 1133 of FIG. 11, prior to transmit the mobility analytics for the UE 1102 to the LMF 1108, the NWDAF 1107 may establish an interface with the LMF 1108. The establishment of the interface may be performed by, e.g., the mobility analytics process component 197, the transceiver(s) 1746, and/or the communication interface 1718/1738/1748 of the network entity 1702 in FIG. 17.

At 1504, the second network entity may receive a request for mobility data associated with a set of UEs, where the request for the mobility data is received from a first network entity, and where the second network entity is associated with mobility data analytics, such as described in connection with FIGS. 10 and 11. For example, at 1031 of FIG. 10, the NWDAF 1107 may receive a request for mobile analytics associated with the UE 1002 from the AMF 1006 or from the LMF 1008 via the AMF 1006. The reception of the request may be performed by, e.g., the mobility analytics process component 197, the transceiver(s) 1746, and/or the communication interface 1718/1738/1748 of the network entity 1702 in FIG. 17.

In one example, the mobility data associated with the set of UEs is at least one of mobility analytics associated with the set of UEs or a set of mobility parameters associated with the set of UEs.

In another example, the mobility data includes: a mobility pattern for the set of UEs, one or more statistics of UE mobility for the set of UEs, a network local policy, one or more historical movements for the set of UEs, one or more predicted movements for the set of UEs, at least one of speed, acceleration, or direction for the set of UEs, or a combination thereof.

In another example, the request for the mobility data is received from the first network entity via a third network entity, and where the indication of the mobility data is transmitted to the first network entity via the third network entity. In such an example, the first network entity is an LMF or a location server, the second network entity is an NWDAF, and the third network entity is an AMF.

In another example, the request for the mobility data is received directly from the first network entity, and where the indication of the mobility data is transmitted directly to the first network entity. In such an example, the first network entity is an LMF or a location server, and the second network entity is an NWDAF.

At 1506, the second network entity may transmit, based on the request, an indication of the mobility data associated with the set of UEs, where the indication of the mobility data is transmitted for the first network entity, such as described in connection with FIGS. 10 and 11. For example, at 1032 of FIG. 10, the NWDAF 1007 may transmit mobile analytics associated with the UE 1002 to the AMF 1006. The transmission of the indication of the mobility data may be performed by, e.g., the mobility analytics process component 197, the transceiver(s) 1746, and/or the communication interface 1718/1738/1748 of the network entity 1702 in FIG. 17.

At 1508, the second network entity may receive, via an AMF, updated mobility data associated with the at least one UE in the set of UEs, such as described in connection with FIGS. 10 and 11. For example, the NWDAF 1007 may receive updated UE mobility related parameter associated with the UE 1002 from the AMF 1006. The reception of the updated mobility data may be performed by, e.g., the mobility analytics process component 197, the transceiver(s) 1746, and/or the communication interface 1718/1738/1748 of the network entity 1702 in FIG. 17. In one example, the updated mobility data includes: PRS resources or TRP resources with a signal strength above or below a signal threshold for the at least one UE; a mobility pattern for the at least one UE, an LOS and NLOS condition with respect to a serving cell and one or more neighboring cells for the at least one UE, multipath information related to the serving cell and the one or more neighboring cells for the at least one UE, Doppler estimation for the at least one UE, or a combination thereof.

Figure 16:
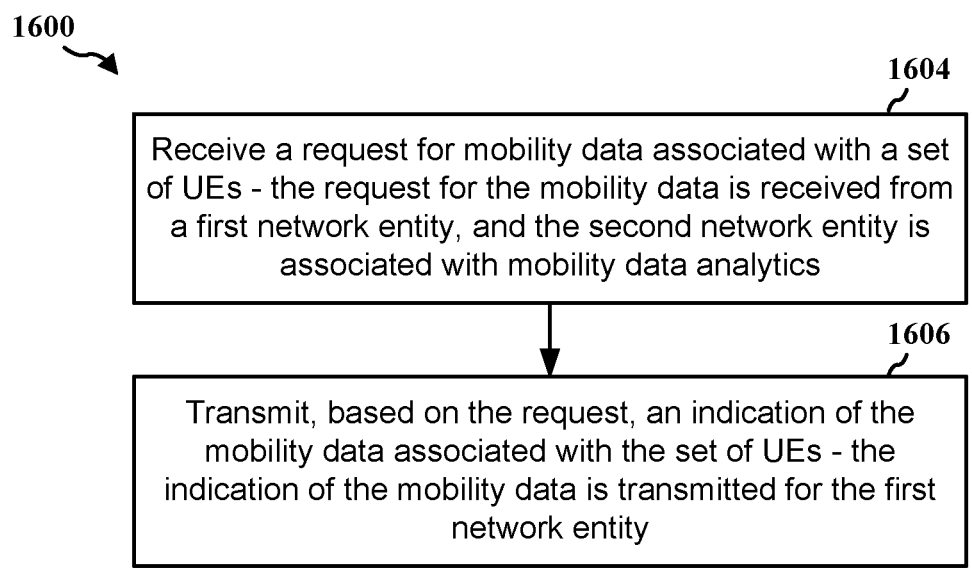
FIG. 16 is a flowchart of a method of wireless communication.

FIG. 16 is a flowchart 1600 of a method of wireless communication. The method may be performed by a second network entity (e.g., the NWDAF 196, 1007, 1107; the network entity 1702). The method may enable the second network entity to provide mobility analytics for a set of UEs to an LMF or a location server to improve location services.

At 1604, the second network entity may receive a request for mobility data associated with a set of UEs, where the request for the mobility data is received from a first network entity, and where the second network entity is associated with mobility data analytics, such as described in connection with FIGS. 10 and 11. For example, at 1031 of FIG. 10, the NWDAF 1107 may receive a request for mobile analytics associated with the UE 1002 from the AMF 1006 or from the LMF 1008 via the AMF 1006. The reception of the request may be performed by, e.g., the mobility analytics process component 197, the transceiver(s) 1746, and/or the communication interface 1718/1738/1748 of the network entity 1702 in FIG. 17.

In one example, the second network entity may establish an interface with the first network entity based on the mobility data associated with the set of UEs, such as described in connection with FIGS. 10 and 11. For example, at 1133 of FIG. 11, prior to transmit the mobility analytics for the UE 1102 to the LMF 1108, the NWDAF 1107 may establish an interface with the LMF 1108. The establishment of the interface may be performed by, e.g., the mobility analytics process component 197, the transceiver(s) 1746, and/or the communication interface 1718/1738/1748 of the network entity 1702 in FIG. 17.

In another example, the mobility data associated with the set of UEs is at least one of mobility analytics associated with the set of UEs or a set of mobility parameters associated with the set of UEs.

In another example, the mobility data includes: a mobility pattern for the set of UEs, one or more statistics of UE mobility for the set of UEs, a network local policy, one or more historical movements for the set of UEs, one or more predicted movements for the set of UEs, at least one of speed, acceleration, or direction for the set of UEs, or a combination thereof.

In another example, the request for the mobility data is received from the first network entity via a third network entity, and where the indication of the mobility data is transmitted to the first network entity via the third network entity. In such an example, the first network entity is an LMF or a location server, the second network entity is an NWDAF, and the third network entity is an AMF.

In another example, the request for the mobility data is received directly from the first network entity, and where the indication of the mobility data is transmitted directly to the first network entity. In such an example, the first network entity is an LMF or a location server, and the second network entity is an NWDAF.

At 1606, the second network entity may transmit, based on the request, an indication of the mobility data associated with the set of UEs, where the indication of the mobility data is transmitted for the first network entity, such as described in connection with FIGS. 10 and 11. For example, at 1032 of FIG. 10, the NWDAF 1007 may transmit mobile analytics associated with the UE 1002 to the AMF 1006. The transmission of the indication of the mobility data may be performed by, e.g., the mobility analytics process component 197, the transceiver(s) 1746, and/or the communication interface 1718/1738/1748 of the network entity 1702 in FIG. 17.

In one example, the second network entity may receive, via an AMF, updated mobility data associated with the at least one UE in the set of UEs, such as described in connection with FIGS. 10 and 11. For example, the NWDAF 1007 may receive updated UE mobility related parameter associated with the UE 1002 from the AMF 1006. The reception of the updated mobility data may be performed by, e.g., the mobility analytics process component 197, the transceiver(s) 1746, and/or the communication interface 1718/1738/1748 of the network entity 1702 in FIG. 17. In such an example, the updated mobility data includes: PRS resources or TRP resources with a signal strength above or below a signal threshold for the at least one UE; a mobility pattern for the at least one UE, an LOS and NLOS condition with respect to a serving cell and one or more neighboring cells for the at least one UE, multipath information related to the serving cell and the one or more neighboring cells for the at least one UE, Doppler estimation for the at least one UE, or a combination thereof.

Figure 17:
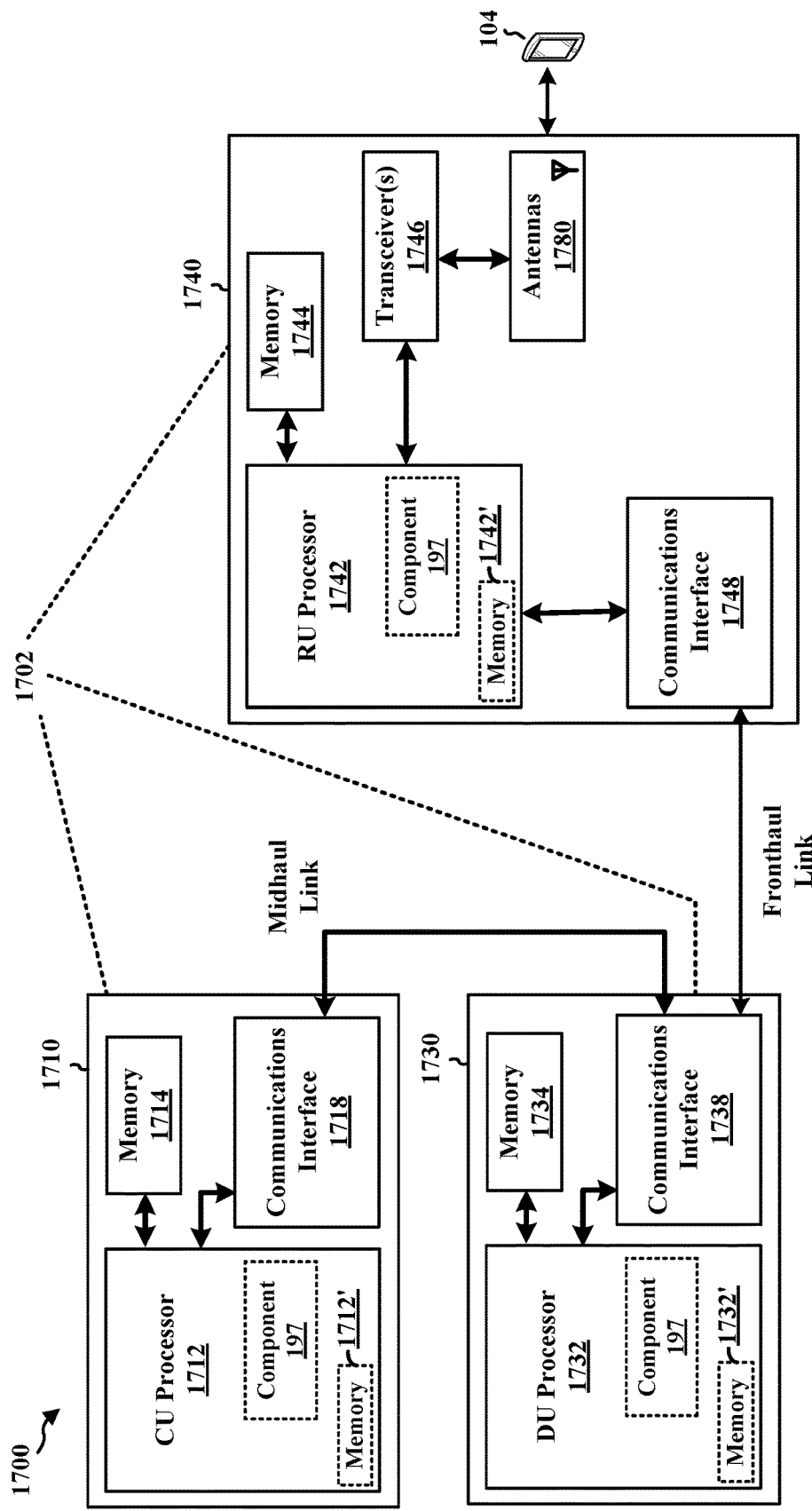
FIG. 17 is a diagram illustrating an example of a hardware implementation for an example apparatus and/or network entity.

FIG. 17 is a diagram 1700 illustrating an example of a hardware implementation for a network entity 1702. The network entity 1702 may be an LMF, a component of an LMF, or may implement LMF functionality. The network entity 1702 may include at least one of a CU 1710, a DU 1730, or an RU 1740. For example, depending on the layer functionality handled by the mobility analytics process component 197, the network entity 1702 may include the CU 1710; both the CU 1710 and the DU 1730; each of the CU 1710, the DU 1730, and the RU 1740; the DU 1730; both the DU 1730 and the RU 1740; or the RU 1740. The CU 1710 may include a CU processor 1712. The CU processor 1712 may include on-chip memory 1712'. In some aspects, the CU 1710 may further include additional memory modules 1714 and a communications interface 1718. The CU 1710 communicates with the DU 1730 through a midhaul link, such as an F1 interface. The DU 1730 may include a DU processor 1732. The DU processor 1732 may include on-chip memory 1732'. In some aspects, the DU 1730 may further include additional memory modules 1734 and a communications interface 1738. The DU 1730 communicates with the RU 1740 through a fronthaul link. The RU 1740 may include an RU processor 1742. The RU processor 1742 may include on-chip memory 1742'. In some aspects, the RU 1740 may further include additional memory modules 1744, one or more transceivers 1746, antennas 1780, and a communications interface 1748. The RU 1740 communicates with the UE 104. The on-chip memory 1712', 1732', 1742' and the additional memory modules 1714, 1734, 1744 may each be considered a computer-readable medium/memory. Each computer-readable medium/memory may be non-transitory. Each of the processors 1712, 1732, 1742 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the mobility analytics process component 197 may be configured to receive a request for mobility data associated with a set of UEs, where the request for the mobility data is received from a first network entity, where the second network entity is associated with mobility data analytics. The mobility analytics process component 197 may also be configured to transmit, based on the request, an indication of the mobility data associated with the set of UEs, where the indication of the mobility data is transmitted for the first network entity. The mobility analytics process component 197 may be within one or more processors of one or more of the CU 1710, DU 1730, and the RU 1740. The mobility analytics process component 197 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1702 may include a variety of components configured for various functions. In one configuration, the network entity 1702 may include means for receiving a request for mobility data associated with a set of UEs, where the request for the mobility data is received from a first network entity, where the second network entity is associated with mobility data analytics. The network entity 1702 may further include means for transmitting, based on the request, an indication of the mobility data associated with the set of UEs, where the indication of the mobility data is transmitted for the first network entity.

In one configuration, the network entity 1702 may further include means for establishing an interface with the first network entity based on the mobility data associated with the set of UEs.

In another configuration, the mobility data associated with the set of UEs is at least one of mobility analytics associated with the set of UEs or a set of mobility parameters associated with the set of UEs.

In another configuration, the mobility data includes: a mobility pattern for the set of UEs, one or more statistics of UE mobility for the set of UEs, a network local policy, one or more historical movements for the set of UEs, one or more predicted movements for the set of UEs, at least one of speed, acceleration, or direction for the set of UEs, or a combination thereof.

In another configuration, the request for the mobility data is received from the first network entity via a third network entity, and where the indication of the mobility data is transmitted to the first network entity via the third network entity. In such a configuration, the first network entity is an LMF or a location server, the second network entity is an NWDAF, and the third network entity is an AMF.

In another configuration, the request for the mobility data is received directly from the first network entity, and where the indication of the mobility data is transmitted directly to the first network entity. In such a configuration, the first network entity is an LMF or a location server, and the second network entity is an NWDAF.

In another configuration, the network entity 1702 may further include means for receiving, via an AMF, updated mobility data associated with the at least one UE in the set of UEs. In such a configuration, the updated mobility data includes: PRS resources or TRP resources with a signal strength above or below a signal threshold for the at least one UE; a mobility pattern for the at least one UE, an LOS and NLOS condition with respect to a serving cell and one or more neighboring cells for the at least one UE, multipath information related to the serving cell and the one or more neighboring cells for the at least one UE, Doppler estimation for the at least one UE, or a combination thereof.

The means may be the mobility analytics process component 197 of the network entity 1702 configured to perform the functions recited by the means. As described supra, the network entity 1702 may include the TX processor 316, the RX processor 370, and the controller/processor 375. As such, in one configuration, the means may be the TX processor 316, the RX processor 370, and/or the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a first network entity, including: transmitting a request for mobility data associated with a set of UEs, where the request for the mobility data is transmitted for a second network entity associated with mobility data analytics; receiving, based on the request, an indication of the mobility data associated with the set of UEs; and performing at least one location function for at least one UE in the set of UEs based on the indication of the mobility data.

Aspect 2 is the method of aspect 1, further including: establishing an interface with the second network entity based on the mobility data associated with the set of UEs.

Aspect 3 is the method of any of aspects 1 or 2, where the mobility data associated with the set of UEs is at least one of mobility analytics associated with the set of UEs or a set of mobility parameters associated with the set of UEs.

Aspect 4 is the method of any of aspects 1 to 3, where the mobility data includes: a mobility pattern for the set of UEs, one or more statistics of UE mobility for the set of UEs, a network local policy, one or more historical movements for the set of UEs, one or more predicted movements for the set of UEs, at least one of speed, acceleration, or direction for the set of UEs, or a combination thereof.

Aspect 5 is the method of any of aspects 1 to 4, where the request for the mobility data is transmitted for the second network entity via a third network entity, and where the indication of the mobility data is received from the second network entity via the third network entity.

Aspect 6 is the method of aspect 5, where the first network entity is an LMF or a location server, the second network entity is an NWDAF, and the third network entity is an AMF.

Aspect 7 is the method of any of aspects 1 to 6, where the request for the mobility data is transmitted directly to the second network entity, and where the indication of the mobility data is received directly from the second network entity.

Aspect 8 is the method of aspect 7, where the first network entity is an LMF or a location server, and the second network entity is an NWDAF.

Aspect 9 is the method of any of aspects 1 to 8, further including: transmitting, to an AMF, updated mobility data associated with the at least one UE in the set of UEs.

Aspect 10 is the method of aspect 9, where the updated mobility data includes: PRS resources or TRP resources with a signal strength above or below a signal threshold for the at least one UE; a mobility pattern for the at least one UE, an LOS and NLOS condition with respect to a serving cell and one or more neighboring cells for the at least one UE, multipath information related to the serving cell and the one or more neighboring cells for the at least one UE, Doppler estimation for the at least one UE, or a combination thereof.

Aspect 11 is the method of aspect 9, where the updated mobility data is forwarded to the second network entity via the AMF.

Aspect 12 is the method of any of aspects 1 to 11, further including: generating AD for the at least one UE or for the set of UEs based on the indication of the mobility data.

Aspect 13 is the method of any of aspects 1 to 12, further including: determining which TRPs, PRS resources sets, or PRS resources to include for the at least one UE or for the set of the UEs based on the indication of the mobility data.

Aspect 14 is the method of any of aspects 1 to 13, further including: selecting a group of UEs from the set of UEs for an SL positioning session based on the indication of the mobility data.

Aspect 15 is the method of any of aspects 1 to 14, where to perform the at least one location function for the at least one UE, the at least one processor is configured to: determine, for the at least one UE or for the set of the UEs, at least one of: at least one positioning method, at least one positioning technology, a pre-configuration of measurement gaps, a pre-configuration of positioning processing windows, a UE-based or UE-assisted mode of operation, at least one expected RSTD window, at least one expected AoD window, at least one expected AoA window, or a combination thereof based on the indication of the mobility data.

Aspect 16 is an apparatus for wireless communication at a first network entity, including: a memory; and at least one processor coupled to the memory and, based at least in part on information stored in the memory, the at least one processor is configured to implement any of aspects 1 to 15.

Aspect 17 is the apparatus of aspect 16, further including at least one of a transceiver or an antenna coupled to the at least one processor.

Aspect 18 is an apparatus for wireless communication including means for implementing any of aspects 1 to 15.

Aspect 19 is a computer-readable medium (e.g., a non-transitory computer-readable medium) storing computer executable code, where the code when executed by a processor causes the processor to implement any of aspects 1 to 15.

Aspect 20 is a method of wireless communication at a second network entity, including: receiving a request for mobility data associated with a set of UEs, where the request for the mobility data is received from a first network entity, where the second network entity is associated with mobility data analytics; and transmitting, based on the request, an indication of the mobility data associated with the set of UEs, where the indication of the mobility data is transmitted for the first network entity.

Aspect 21 is the method of aspect 20, further including: establishing an interface with the first network entity based on the mobility data associated with the set of UEs.

Aspect 22 is the method of any of aspects 20 or 21, where the mobility data associated with the set of UEs is at least one of mobility analytics associated with the set of UEs or a set of mobility parameters associated with the set of UEs.

Aspect 23 is the method of any of aspects 20 to 22, where the mobility data includes: a mobility pattern for the set of UEs, one or more statistics of UE mobility for the set of UEs, a network local policy, one or more historical movements for the set of UEs, one or more predicted movements for the set of UEs, at least one of speed, acceleration, or direction for the set of UEs, or a combination thereof.

Aspect 24 is the method of any of aspects 20 to 23, where the request for the mobility data is received from the first network entity via a third network entity, and where the indication of the mobility data is transmitted to the first network entity via the third network entity.

Aspect 25 is the method of aspect 24, where the first network entity is an LMF or a location server, the second network entity is an NWDAF, and the third network entity is an AMF.

Aspect 26 is the method of any of aspects 20 to 25, where the request for the mobility data is received directly from the first network entity, and where the indication of the mobility data is transmitted directly to the first network entity.

Aspect 27 is the method of aspect 26, where the first network entity is an LMF or a location server, and the second network entity is an NWDAF.

Aspect 28 is the method of any of aspects 20 to 27, further including: receiving, via an AMF, updated mobility data associated with the at least one UE in the set of UEs.

Aspect 29 is the method of aspect 28, where the updated mobility data includes: PRS resources or TRP resources with a signal strength above or below a signal threshold for the at least one UE; a mobility pattern for the at least one UE, an LOS and NLOS condition with respect to a serving cell and one or more neighboring cells for the at least one UE, multipath information related to the serving cell and the one or more neighboring cells for the at least one UE, Doppler estimation for the at least one UE, or a combination thereof.

Aspect 30 is an apparatus for wireless communication at a second network entity, including: a memory; and at least one processor coupled to the memory and, based at least in part on information stored in the memory, the at least one processor is configured to implement any of aspects 20 to 29.

Aspect 31 is the apparatus of aspect 30, further including at least one of a transceiver or an antenna coupled to the at least one processor.

Aspect 32 is an apparatus for wireless communication including means for implementing any of aspects 20 to 29.

Aspect 33 is a computer-readable medium (e.g., a non-transitory computer-readable medium) storing computer executable code, where the code when executed by a processor causes the processor to implement any of aspects 20 to 29.

What is claimed is:

1. An apparatus for wireless communication at a location server, comprising:
at least one memory; and
at least one processor coupled to the at least one memory and, based at least in part on information stored in the memory, the at least one processor is configured to:
transmit, directly to a network data analytics function (NWDAF) or indirectly to the NWDAF via an access and mobility management function (AMF), a request for mobility data associated with a set of user equipments (UEs);
receive, from the NWDAF or the AMF based on the request, an indication of the mobility data associated with the set of UEs; and
perform at least one location function for at least one UE in the set of UEs based on the indication of the mobility data.

2. The apparatus of claim 1, wherein the at least one processor is further configured to:
establish an interface with the NWDAF based on the mobility data associated with the set of UEs.

3. The apparatus of claim 1, wherein the mobility data associated with the set of UEs is at least one of mobility analytics associated with the set of UEs or a set of mobility parameters associated with the set of UEs.

4. The apparatus of claim 1, wherein the mobility data includes:
a mobility pattern for the set of UEs,
one or more statistics of UE mobility for the set of UEs,
a network local policy,
one or more historical movements for the set of UEs,
one or more predicted movements for the set of UEs,
at least one of speed, acceleration, or direction for the set of UEs, or
a combination thereof.

5. The apparatus of claim 1, wherein to transmit the request for the mobility data, the at least one processor is configured to transmit the request for the mobility data for the NWDAF via the AMF, and wherein to receive the indication of the mobility data, the at least one processor is configured to receive the indication of the mobility data from the NWDAF via the AMF.

6. The apparatus of claim 5, wherein the location server is a location management function (LMF).

7. The apparatus of claim 1, wherein to transmit the request for the mobility data, the at least one processor is configured to transmit the request for the mobility data directly to the NWDAF, and wherein to receive the indication of the mobility data, the at least one processor is configured to receive the indication of the mobility data directly from the NWDAF.

8. The apparatus of claim 7, wherein the location server is a location management function (LMF).

9. The apparatus of claim 1, wherein the at least one processor is further configured to:
transmit, to the AMF, updated mobility data associated with the at least one UE in the set of UEs.

10. The apparatus of claim 9, wherein the updated mobility data includes:
positioning reference signal (PRS) resources or transmission reception point (TRP) resources with a signal strength above or below a signal threshold for the at least one UE;
a mobility pattern for the at least one UE,
a line-of-sight (LOS) and non-line-of-sight (NLOS) condition with respect to a serving cell and one or more neighboring cells for the at least one UE,
multipath information related to the serving cell and the one or more neighboring cells for the at least one UE,
Doppler estimation for the at least one UE, or
a combination thereof.

11. The apparatus of claim 9, wherein the updated mobility data is forwarded to the NWDAF via the AMF.

12. The apparatus of claim 1, wherein to perform the at least one location function for the at least one UE, the at least one processor is configured to:
generate assistance data (AD) for the at least one UE or for the set of UEs based on the indication of the mobility data.

13. The apparatus of claim 1, wherein to perform the at least one location function for the at least one UE, the at least one processor is configured to:
determine which transmission reception points (TRPs), positioning reference signal (PRS) resources sets, or PRS resources to include for the at least one UE or for the set of the UEs based on the indication of the mobility data.

14. The apparatus of claim 1, wherein to perform the at least one location function for the at least one UE, the at least one processor is configured to:
select a group of UEs from the set of UEs for a sidelink (SL) positioning session based on the indication of the mobility data.

15. The apparatus of claim 1, wherein to perform the at least one location function for the at least one UE, the at least one processor is configured to:
determine, for the at least one UE or for the set of the UEs, at least one of:
at least one positioning method,
at least one positioning technology,
a pre-configuration of measurement gaps,
a pre-configuration of positioning processing windows,
a UE-based or UE-assisted mode of operation,
at least one expected reference signal time difference (RSTD) window,
at least one expected angle of departure (AoD) window,
at least one expected angle of arrival (AoA) window, or
a combination thereof based on the indication of the mobility data.

16. A method of wireless communication at a location server, comprising:

transmitting, directly to a network data analytics function (NWDAF) or indirectly to the NWDAF via an access and mobility management function (AMF), a request for mobility data associated with a set of user equipments (UEs);

receiving, from the NWDAF or the AMF based on the request, an indication of the mobility data associated with the set of UEs; and performing at least one location function for at least one UE in the set of UEs based on the indication of the mobility data.

17. The method of claim 16, wherein the mobility data includes:
a mobility pattern for the set of UEs,
one or more statistics of UE mobility for the set of UEs,
a network local policy,
one or more historical movements for the set of UEs,
one or more predicted movements for the set of UEs,
at least one of speed, acceleration, or direction for the set of UEs, or
a combination thereof.

18. The method of claim 16, further comprising:
transmitting, to the AMF, updated mobility data associated with the at least one UE in the set of UEs.

19. An apparatus for wireless communication at a network data analytics function (NWDAF), comprising:
a memory; and
at least one processor coupled to the memory and, based at least in part on information stored in the memory, the at least one processor is configured to:
receive, directly from a location server or indirectly from the location server via an access and mobility management function (AMF), a request for mobility data associated with a set of user equipments (UEs); and
transmit, to the location server or the AMF based on the request, an indication of the mobility data associated with the set of UEs.

20. The apparatus of claim 19, wherein the at least one processor is further configured to:
establish an interface with the location server based on the mobility data associated with the set of UEs.

21. The apparatus of claim 19, wherein the mobility data associated with the set of UEs is at least one of mobility analytics associated with the set of UEs or a set of mobility parameters associated with the set of UEs.

22. The apparatus of claim 19, wherein the mobility data includes:
a mobility pattern for the set of UEs,
one or more statistics of UE mobility for the set of UEs,
a network local policy,
one or more historical movements for the set of UEs,
one or more predicted movements for the set of UEs,
at least one of speed, acceleration, or direction for the set of UEs, or
a combination thereof.

23. The apparatus of claim 19, wherein to receive the request for the mobility data, the at least one processor is configured to receive the request for the mobility data from the location server via the AMF, and wherein to transmit the indication of the mobility data, the at least one processor is configured to transmit the indication of the mobility data to the location server via the AMF.

24. The apparatus of claim 23, wherein the location server is a location management function (LMF).

25. The apparatus of claim 19, wherein to receive the request for the mobility data, the at least one processor is configured to receive the request for the mobility data directly from the location server, and wherein to transmit the indication of the mobility data, the at least one processor is configured to transmit the indication of the mobility data directly to the location server.

26. The apparatus of claim 25, wherein the location server is a location management function (LMF).

27. The apparatus of claim 19, wherein the at least one processor is further configured to:
receive, via the AMF, updated mobility data associated with at least one UE in the set of UEs.

28. The apparatus of claim 27, wherein the updated mobility data includes:
positioning reference signal (PRS) resources or transmission reception point (TRP) resources with a signal strength above or below a signal threshold for the at least one UE;
a mobility pattern for the at least one UE,
a line-of-sight (LOS) and non-line-of-sight (NLOS) condition with respect to a serving cell and one or more neighboring cells for the at least one UE,
multipath information related to the serving cell and the one or more neighboring cells for the at least one UE,
Doppler estimation for the at least one UE, or
a combination thereof.

29. A method of wireless communication at a network data analytics function (NWDAF), comprising:
receiving, directly from a location server or indirectly from the location server via an access and mobility management function (AMF), a request for mobility data associated with a set of user equipments (UEs); and
transmitting, to the location server or the AMF based on the request, an indication of the mobility data associated with the set of UEs.

30. The method of claim 29, wherein the mobility data includes:
a mobility pattern for the set of UEs,
one or more statistics of UE mobility for the set of UEs,
a network local policy,
one or more historical movements for the set of UEs,
one or more predicted movements for the set of UEs,
at least one of speed, acceleration, or direction for the set of UEs, or
a combination thereof.

* * * * *